(12) United States Patent
Astala et al.

(10) Patent No.: US 7,526,762 B1
(45) Date of Patent: Apr. 28, 2009

(54) NETWORK WITH MOBILE TERMINALS AS BROWSERS HAVING WIRELESS ACCESS TO THE INTERNET AND METHOD FOR USING SAME

(75) Inventors: Arto Astala, Vantaa (FI); Timo Ellila, Halikko (FI); Petri Asunmaa, Espoo (FI); Kimmo Djupsjobacka, Palo Alto, CA (US); John Grundy, Menlo Park, CA (US); Ilari Saarikivi, Salo (FI); Sampo Savolainen, Espoo (FI); Patrik Lindblom, Lexington, MA (US); Anders Frisk, Menlo Park, CA (US); Martha Zimet, Santa Cruz, CA (US); Otso Ylonen, Salo (FI); Thomas Abrahamson, Linkoping (SE)

(73) Assignee: Nokia Corporation, Espoo (FI)

( * ) Notice: Subject to any disclaimer, the term of this patent is extended or adjusted under 35 U.S.C. 154(b) by 1228 days.

(21) Appl. No.: 09/659,416

(22) Filed: Sep. 11, 2000

Related U.S. Application Data

(63) Continuation-in-part of application No. 09/607,637, filed on Jun. 30, 2000, now abandoned.

(51) Int. Cl.
*G06F 9/44* (2006.01)
(52) U.S. Cl. .................. 717/171; 709/203; 709/217; 709/222; 709/232; 717/168
(58) Field of Classification Search ............... 455/419; 709/220–223, 206, 219, 224, 203, 217, 232; 717/168–173
See application file for complete search history.

(56) References Cited

U.S. PATENT DOCUMENTS 5,706,502 A    1/1998    Foley et al.

(Continued)

FOREIGN PATENT DOCUMENTS

WO     WO 99/27742     6/1999

(Continued)

OTHER PUBLICATIONS

"Home Internet Appliances"; iPAQ internet devices; http://athome.compaq.com/showroom/static/ipaq/intappliance.asp; Aug. 21, 2000.

(Continued)

*Primary Examiner*—Phuoc Nguyen
(74) *Attorney, Agent, or Firm*—Alston & Bird LLP

(57) ABSTRACT

A system and method are provided that allow a user to perform information management tasks and access the Internet. The system includes a terminal that is part of a family and capable of wireless communication, a gateway, an Internet Service Provider (ISP), a server for authenticating the terminal, a global unit for providing the internet address of the server to the terminal, and browser logic stored in the terminal or the server. The method includes the steps of powering on the terminal, establishing a communication link with the gateway to obtain an internet address for the terminal relative to the internet address of the gateway, obtaining an internet address for the server, and establishing a family communication session between the terminal and the server to allow access to information management services, and launching a browser to provide an interface to the internet.

12 Claims, 14 Drawing Sheets

U.S. PATENT DOCUMENTS

| | | | |
|---|---|---|---|
| 5,724,345 A * | 3/1998 | Guarneri et al. | 370/316 |
| 5,809,415 A | 9/1998 | Rossman | |
| 5,835,061 A | 11/1998 | Stewart | |
| 5,848,243 A | 12/1998 | Kulkarni et al. | |
| 5,874,958 A | 2/1999 | Ludolph | |
| 5,895,471 A | 4/1999 | King et al. | |
| 5,897,644 A | 4/1999 | Nielsen | |
| 5,923,328 A | 7/1999 | Griesmer | |
| 5,963,964 A | 10/1999 | Nielsen | |
| 5,974,454 A | 10/1999 | Apfel et al. | |
| 6,006,034 A * | 12/1999 | Heath et al. | 717/170 |
| 6,058,416 A | 5/2000 | Mukherjee et al. | |
| 6,058,421 A | 5/2000 | Fijolek et al. | |
| 6,080,207 A * | 6/2000 | Kroening et al. | 717/172 |
| 6,081,840 A * | 6/2000 | Zhao | 709/224 |
| 6,085,244 A * | 7/2000 | Wookey | 709/224 |
| 6,105,063 A * | 8/2000 | Hayes, Jr. | 709/223 |
| 6,122,503 A | 9/2000 | Daly | |
| 6,141,681 A * | 10/2000 | Kyle | 709/246 |
| 6,151,643 A * | 11/2000 | Cheng et al. | 709/224 |
| 6,192,410 B1 * | 2/2001 | Miller et al. | 709/232 |
| 6,199,204 B1 * | 3/2001 | Donohue | 717/178 |
| 6,360,255 B1 * | 3/2002 | McCormack et al. | 709/221 |
| 6,425,125 B1 * | 7/2002 | Fries et al. | 717/168 |
| 6,510,466 B1 * | 1/2003 | Cox et al. | 709/229 |
| 6,526,371 B1 * | 2/2003 | Klein et al. | 702/186 |
| 6,587,684 B1 * | 7/2003 | Hsu et al. | 455/419 |
| 6,615,038 B1 * | 9/2003 | Moles et al. | 455/418 |
| 6,622,017 B1 * | 9/2003 | Hoffman | 455/419 |
| 6,643,506 B1 * | 11/2003 | Criss et al. | 455/419 |
| 6,671,724 B1 * | 12/2003 | Pandya et al. | 709/226 |
| 6,725,377 B1 * | 4/2004 | Kouznetsov | 726/23 |
| 6,751,794 B1 * | 6/2004 | McCaleb et al. | 717/168 |
| 6,964,044 B1 * | 11/2005 | Hudson et al. | 717/177 |
| 6,976,062 B1 * | 12/2005 | Denby et al. | 709/220 |
| 6,988,267 B2 * | 1/2006 | Harris et al. | 717/173 |
| 7,206,852 B2 * | 4/2007 | Ferguson et al. | 709/229 |
| 7,219,106 B2 * | 5/2007 | Chung | 707/104.1 |
| 2003/0001888 A1 * | 1/2003 | Power | 709/219 |

FOREIGN PATENT DOCUMENTS

| | | |
|---|---|---|
| WO | WO 99/63416 | 12/1999 |
| WO | WO 00/04146 | 7/2000 |

OTHER PUBLICATIONS

"Lectrice Virtual Book"; Hayter et al.; digital; http://www.research.digital.com/SRC/virtualbook/; Aug. 31, 2000.

"Windows-Based Terminals, PCs, and NetPCs."; Displays and Peripherals Division; Compaq Computer Corporation; Feb. 1999.

"Teleweb: Loosely Connected Access to the World Wide Web"; Fifth International World Wide Web Conference; http://www5conf.inrla.fr/fich_html/papers/P47/Overview.html; May 6-10, 1996.

"Instant Access All Day for Targeted Mobile Business Needs"; Compaq Handheld PC Solutions.

"What is WebPAD?"; PAD:User Page (#453) National Semiconductor; http://www.national.com/appinfo/solutions/0,2062453,00.html; Sep. 14, 2000.

"The Portable, Instant Internet"; PAD: Portable, Instant Internet; National Semiconductor; http://www.national.com/appinfo/solutions/0,2062195,00.html; Sep. 14, 2000.

"Geode WebPAD SP3GX01 Frequently Asked Questions"; PAD: WebPAD FAQ; National Semiconductor; http://www.national.com/appinfo/solutions/0,2062,201,00.html; Sep. 14, 2000.

"Personal Access Device Market Brief"; PAD: Market Brief (#207); National Semiconductor; http://www.national.com/appinfo/solutions/0,2062207,00.html; Sep. 14, 2000.

"WebPAD Technology Solutions"; PAD: Technology National Semiconductor; http://www.national.com/appinfo/solutions/0,2062,388,00.html; Sep. 14, 2000.

"First Commercially Available National Geode WebPAD Devices Showcased at CEBIT 2000"; News Release—National Semiconductor Feb. 24, 2000; http://www.national.com/news/item/0,1735,477,00.html; Sep. 14, 2000.

"The Age of Information Access" National Semiconductor.

"Digital Living Room Holds Future of Entertainment Technology"; St. John, Jeff; Upside Today Jun. 19, 2000. http://www.upsidetoday.com/texis/mvm/print-it?id=394ead070&t=/texis/mvm/news/news.

"About Thin Clients"; National Semiconductor; http://www.national.com/appinfo/thinclient/About.html Sep. 14, 2000.

"What Are Thin Clients"; National Semiconductor; http://www.national.com/appinfo/thinclient/thinclients.html Sep. 14, 2000.

"What Makes a Thin-Client Solution"?; National Semiconductor; www.national.com/appinfo/thinclient/ingredients.html Sep. 14, 2000.

* cited by examiner

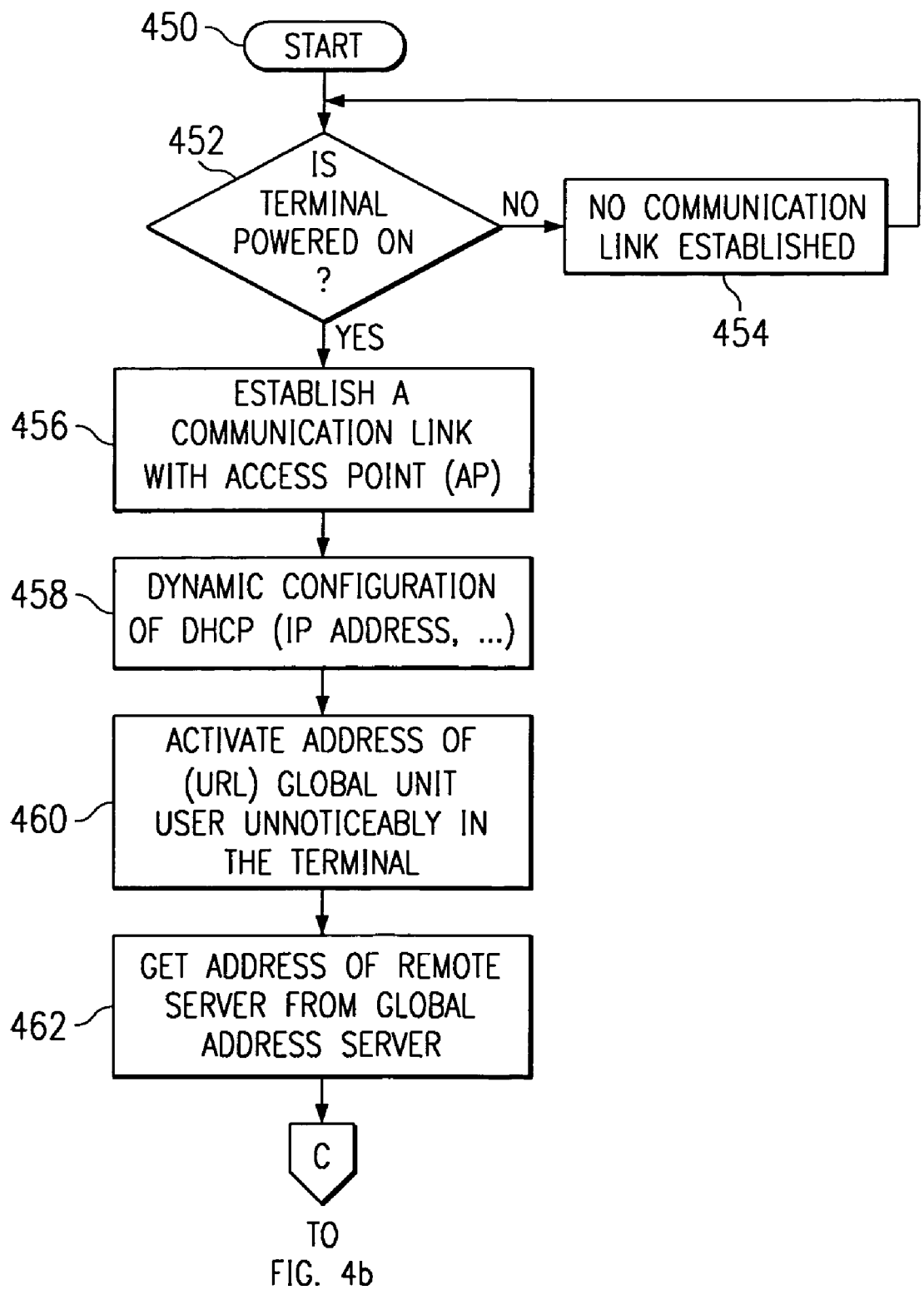

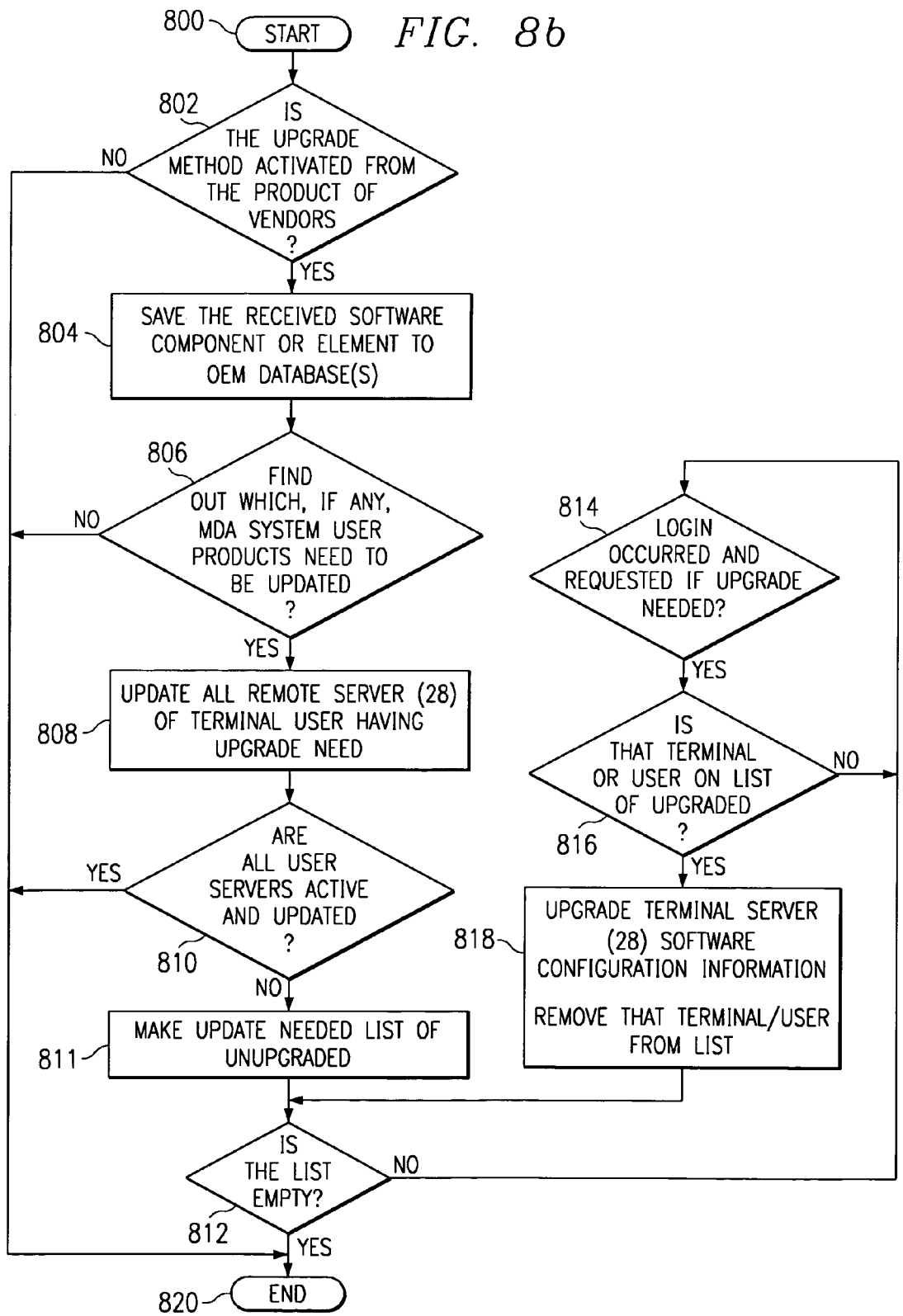

NETWORK WITH MOBILE TERMINALS AS BROWSERS HAVING WIRELESS ACCESS TO THE INTERNET AND METHOD FOR USING SAME

RELATED APPLICATIONS

This patent application is a Continuation-in-Part of U.S. Ser. No. 09/607,637 filed Jun. 30, 2000 now abandoned. This application is related to co-pending U.S. patent application Ser. No. 09/617,369, filed on Jun. 30, 2000, entitled USER INTERFACE CONSTRUCTED FROM COMPONENTS CREATED FROM A SET OF TAGS and co-pending U.S. patent application Ser. No. 09/609,581, filed on Jun. 30, 2000, entitled NETWORK WITH MOBILE TERMINALS HAVING WIRELESS ACCESS TO THE INTERNET AND METHOD FOR DOING SAME assigned to and commonly owned by Nokia Corporation of Espoo, Finland and are herein incorporated by reference.

BACKGROUND OF THE INVENTION

This invention relates generally to communication networks and, more specifically, to mobile terminals in a network with information management services and Internet accessibility.

Known methods of providing access to the Internet include connecting to the Internet through an Internet Service Provider (ISP). Typically, a user selects one ISP and uses that ISP to gain access to the Internet. In order to gain access to the Internet through the ISP, the user must have a terminal capable of connecting to the ISP. Additionally, the terminal must also have the ability to retrieve information from the Internet. For example, a typical Personal Computer (PC) has a communication port with a communication device, such as a modem, which can connect to the selected ISP via landlines, telephone network and the like. Once connected, the PC has an Internet navigational tool, such a web browser, stored in the PC's memory, which the user uses to navigate through the Internet to retrieve and display, on a typical monitor, the desired information. However, the limitation of such a system is being able to provide cost effective portability and mobility. For example, a portable PC or laptop computer can be carried from one location to another, but accessing the Internet or other related services typically requires costly connection fees and charges, such as fees charged by a hotel. Additionally, when one is at a remote location a phone number and other access information must be discovered and the unit must be recovered for the new access point.

Currently, known solutions to providing a user with a more portable and mobile unit is the use of wireless units, which are terminal clients, (also referred to as terminal units), with most of its functionality stored in a remote location. A terminal client is a device having most of the functionality stored and carried out remotely. For example, a terminal client would not have its own web browsing capability. Given that the user's wireless unit is a terminal unit, it depends entirely on the system for interaction with other services, such as the Internet, and packaging of the information in a format that is compatible with the user's wireless unit. At present, a wireless or a wired unit interfaces with systems that have the ability to package and transmit information to the wireless and wired terminals. Typically, the system has global Internet accessibility and navigational capability. The system retrieves, packages, and transmits information to the wireless unit. In order to be able to receive the information, a remotely located system must package the information in such a format and size that is suitable for the wireless unit. For example, a system that is connected to the Internet can retrieve information from the Internet, package that information so that the information is compatible with and can be wirelessly transmitted to the user's wireless unit. However, the problem with this solution is that the user's wireless unit is a terminal client having limited capabilities for receiving, storing and presenting the information.

At present, there is known a thin client and network system arrangement that is presented in U.S. Pat. No. 5,895,471 entitled PROVIDING A DIRECTORY OF FREQUENTLY USED HYPERLINKS ON A REMOTE SERVER, issued to King et al. on Apr. 20, 1999, assigned to Unwired Planet, Inc. (presently known as Phone.Com, Inc. (Redwood City, Calif.). Said patent is incorporated herein by reference. In the patent, an access to hyperlink servers connected to the networks, such as the Internet, is provided via mobile public network and using mobile terminals of the system. Hypermedia links, such as Uniform Resource Locators (URL), are used to identify and control access to resources on the network and are stored on a bookmark server in the mobile network. An embodiment in which URL of bookmark server is sent to the mobile server during initialization of the device and user specific list of bookmarks are saved, retrieved and maintained in the bookmark server is simplified to certain extent.

Since the user's wireless unit is a portable unit, then there is a good chance that the user's wireless unit will enter a network that is not in communication with the system that provides the user's wireless unit with the desired data. Consequently, if the user's wireless unit is operating in the network and there is no system capable of packaging and transmitting the requested information to the wireless unit in such a way, that the limited resources of the terminal is taken into account, then the user's wireless unit is of little use.

Another problem occurs when the wireless terminal is such a device, that a client program specific information of the Internet web browser resides in a remote server and is coupled to an Internet server and global network. Such terminal client system arrangement has requirements to possibly serve one or several independent terminals concurrently. Independent terminal and its user interface and possibly activated web browser session, which is provided to each terminal user may have a different look and feel concerning the web browser, which is accomplished by having user specific browser configuration parameters.

Having non-predefined parameter configuration of browser may cause problems in providing certain service and/or vendor specific look and feel in the end user interface.

Also, additional problems may occur as a result of freely defined browser configurations. Viruses may be downloaded to the terminal and jeopardize the user's information security both during an active browser session as well as when the browser is inactive, resulting in the need to save configure parameters of browser, services, and other user specific information in server memory means.

Additionally, if optional terminal system services are used, the security of those pieces of information saved in server memory means may become a problem to maintain unaffected by viruses and the like. If any one of the terminal users, which are supported in same network server, is not using the system securely nor does not have enough knowledge of browsers and the problems that viruses and other fraudulent like uncertified or originated from unauthorized sources and other dangerous software material downloaded from the Internet may cause.

Additional problems of freely configurable browser settings are that certain browser specific software items, such as cookies, may be prevented from functioning in the terminal system. This may be problematic if the user's network service agreement contains such pricing and service arrangement in which the end user has committed to receive advertisements and/or allow service providers and/or network operators to collect statistical information from user's behavior in the network.

A further additional problem of freely configurable browser settings which may occur are that direct links to external Internet sites may be set in the browser client configuration settings. This is especially problematic when those external site configuration are changed independently of the browser client. While trying to access the linked site, the browser client may face a link error.

Problems may occur when access to Internet services are attempted and the terminal does not establish contact with system server(s) that contain(s) essential information of the configuration and services offered for the user. This results in the terminal not being able to offer the browser service for the terminal user.

Problems may also occur when the service provider or network operator has enhanced techniques to offer and user terminals are older versions as opposed to the very newest ones for which the enhanced techniques are intended. This results in not all the subscribers wanting to have the newest services will be able to get these newest services. Therefore, what is needed is a network with mobile terminals that provide information management and internet accessibility, wherein terminals may be offer web browser capabilities serving each user session independently of other similar terminals through a remotely located server. The remote server contains user specific browser parameters such as cookies, bookmarks, and browser history data and/or program sections that are session specific and are either mandatory or additional information that is used when services from the network are accessed by the terminals regardless of the geographical location of the terminal relative to the server.

Due to traffic capacity reasons in network connection, points like remote server and ISP gateway need to be arranged tolerable in the network side. The air interface access point provider may offer support to at least part of the browser information parameters providing network connection support via wireless network access point to internet service provider (ISP) and further on to global network, without remote server support. The ISP server may provide information parameter(s) for the browser session as well. It is not disabled to have a radio connection from terminal to access point of the access point provider coupled to a global internet. Therefore, all browser specific information parameters may be supported in the access point unit at the network side.

It may also be required that certain browser specific parameters have specific configuration content in order to prevent viruses from being downloaded among with other downloaded information from the Internet.

The user payload, (i.e. the actually browsed data content), is conveyed via MDA server making content filtering and content transformation possible. Another alternative is that browsed payload goes via Internet Service Provider without going through MDA server and thus not producing traffic volume to the MDA server.

SUMMARY OF THE INVENTION

A system and method are set forth with mobile terminals that provide information management and Internet accessibility to a user. The terminals may be in connection with Internet service provider site via a remotely located server. The server may contain general terminal specific configuration information and possibly part of terminal programs and data that can be used when web browser is used for accessing other internet server sites and services offered therefrom. The terminals being activated have a connection via wireless access point to remote server that together with thin terminal methods and arrangements offer web browser capability. The terminal users that have a network connection via the same access point have independent web browsing service sessions offered to each user resulting in each user having their own cookies, list of bookmarks and browsing history among others. When additional options are used, user may use, for instance, peripherals, which are connected to his own or e.g. home located remote terminal server. Users may also have additional memory storage space or additional memory storage means in their home located support server of the terminal. In the server, the user may have storage of e-mails, calendar and other private applications as well as Internet downloaded information products in addition to browser specific user parameters such as cookies, list of bookmarks and browsing history information and the like.

In order to satisfy accessibility and security requirements; light protection may be conveyed by requiring an user specific password be given when requesting access to private user information that resides in remote server. The information stored in remote network server, browser service specific as well as thin client specific service parameters and configurations, are saved in a first memory area other than a second memory area where any other more temporary information and service content are downloaded from the Internet. As a result, full isolation of the two memory areas in server is achieved in such a way, that no harm is caused in the first memory area if the second memory area is corrupted or infected by viruses or the like.

The smallest information package that is conveyed from network server to terminal as response to earlier user control input is such a piece of information that may be required to display in one user interface view on the display of the thin terminal device and in such a way as making possible an optimum way to transfer, process and display information in terminal system. The system is within a network that provides a user with a communication session that includes Internet access using a browser and possibly optional information management and application services.

The terminal offers the best available browsing services as can be offered at the time of the access request. The system includes at least one terminal that is capable of wireless communication, a gateway coupled to the terminal previously known as remote server of the terminal, an Internet Service Provider (ISP) coupled to the gateway for providing Internet access. In a system arrangement, a remote server is coupled to at least one specific register gateway for authenticating the terminal and providing information management services, and a global unit is coupled to the specific register gateway for providing the internet address of the server to the terminal. The activation of the terminal initiates a request to the server for authentication of the terminal in order to establish a shared communication session. Those two registers may be different register means; one specialized only for authentication, the other register being specialized for providing Internet address of remote server of the terminal. However, either gateway—the authentication register and/or remote server—may be integrated as a part of another server. Alternatively, the authentication register connection may be made either from radio access point of access provider or from server of ISP. When the terminal is switched on and possibly some terminal initialization methods are processed, a browser application is started to allow the user to interface with the Internet.

The basic method is activated for providing a user with wireless access to the Internet through a terminal capable of wireless communication with a server. Accessing the remote server includes the steps of powering on the terminal, establishing a communication link with the gateway to obtain an internet address for the terminal relative to the internet address of the gateway, obtaining an internet address for the server that will be authenticating the terminal and possibly downloading to the terminal vendor and operator specific information and/or parts of program objects if required, and establishing a communication session between the terminal and the server to allow access to information by using the web browsing service.

The optional method for providing a user with wireless access to the internet through a terminal capable of wireless communication with a server and although a gateway server includes the steps of powering on the terminal, establishing a communication link with the gateway to obtain an internet address for the terminal relative to the internet address of the gateway, obtaining an internet address for the remote server that will be authenticating the terminal and downloading to the terminal the user profile configuration, and establishing a shared communication session between the terminal and the remote server, which address was received to allow access to information management services and web browsing. The authorization may be performed before MDA server connection is established resulting in the authority certificate residing in either the terminal itself or in access point or ISP service point.

An alternative method to access the internet includes the steps of powering on the terminal, establishing a communication link with the radio access point that will be authenticating the terminal, the authority certificate may be located either in terminal or in the access point of the access server. A connection from the terminal via ISP gateway into global network may be established by using dynamic configuration protocol, (DHCP). Then, the access point establishes a communication link with the gateway to obtain the internet address of the ISP and possibly downloading services information and/or parts of program objects required in the terminal for support of the MDA services from an address stored in the access point to the terminal. A communication session is then established between the terminal and the global server used for browsing service. Thus, the MDA server may not be used in the authorization and login process at all.

Alternatively, the browser login may proceed after the access point has completed the authorization of the terminal. Similarly the authorization may be activated by the ISP server. After the connection is established from terminal via access point further to the ISP, which activates authorization by requesting from the gateway server terminal validity. The MDA server is not used for authorization nor login process. The authorization certificate may be stored in ISP, access point (AP) or even in the terminal. The configuration parameters of MDA services used for browser may be downloaded to the terminal from the ISP or from the address provided by the ISP as result of this authorization process.

Advantageously, the new software components, also known as objects, may be downloaded from different sources from the network to network server of the terminal. Also, at least part of software object may be downloaded from server of terminal to terminal itself. Software sources from where downloaded products may originate are vendor of the terminal system, Internet network operator, and possibly even content service provider.

An advantage to the present system and method is a cost effective and secure solution for complete portability that allows full access to the internet and, when optional individual user profile services are used, information management service, which may be either at a generic or a personal or individual level.

Additionally, the browser specific parameters having specific configuration content results in the network provider being able reconfigure and update new configuration content to terminal and server in such a way that the look and feel of the available user interface and available services are as the end user wanted.

Furthermore, the browser specific parameters having specific configuration content results in the server vendor and/or service provider of the terminal and server to be able to support reconfiguring. The update of a terminal and server allows the look and feel of the available user interface and available services to be the latest offered to the user by the network operator and/or service providers.

Also, in order to give best quality of service (QoS) and most suitable web browsing for the terminal user, the terminal configuration of memory means control, bearer connection configuration, and user interface, among others, may be downloaded from network to server and possibly also to terminal, if required.

Additional to all above, information parameters and/or objects and web browsing specific information may be prioritized resulting in certain download order to be conducted and the terminal to be ready for use as if the terminal itself would comprise all configuration parameters. Those parameters of the web browser and possible optional services are initialized when the terminal is powered on in such a way that user is ignorant of server side dependency of the terminal.

Additionally, items other than user interface of the terminal may require alteration in order to give best benefit and service to be offered and provided for web browsing without requiring terminal owner to take the terminal to a service point.

An additional advantage to all above is to offer accessibility from anywhere. Access point (AP) units are built-in to establish contact to a specific remote server, which offers individual services like usage of interface terminals, printers and the like. Then at least certain part of the configuration parameters and settings of the terminal web browser are saved. Also, memory storage means of the server are used for storing any user specific personal information including authentication information of Internet Service Providers. Even the access point of the access provider or service unit of ISP may contain some configuration parameters like certificates or address where from the MDA service parameters may be downloaded to the terminal.

Private user information needs to be handled securely and at least a light protection level achieved. Additionally, certain predictable configuration of the terminal browser needs to be in use all the time in order to be in compliance with service providers commercial agreements made with third parties.

Additionally, terminal system specific web browsing configuration and optional and additional user specific services such as e-mail, calendar, etc. are isolated from other section of the system that is involved in temporary and session specific support while global internet is accessed.

Additionally, control logic needs to be included in the terminal resulting in an end user being able to receive the best possible service that is available to the user at the access request moment. The service offered for the user terminal varies from full browsing capability to additional user services, which either functions without additional remote server support or receives enhanced support from remote server on the network.

BRIEF DESCRIPTION OF THE DRAWINGS

The above set forth and other features of the invention are made more apparent in the ensuing Detailed Description of the Invention when read in conjunction with the attached Drawings, wherein:

FIG. 5b is a continuing flowchart of the process started in FIG. 5. Concerning the establishment of a communication link between the mobile terminal and the server.

FIG. 8b is a more detailed presentation of management and download methods done by vendor is shown in a flowchart.

DETAILED DESCRIPTION

Figure 1A:
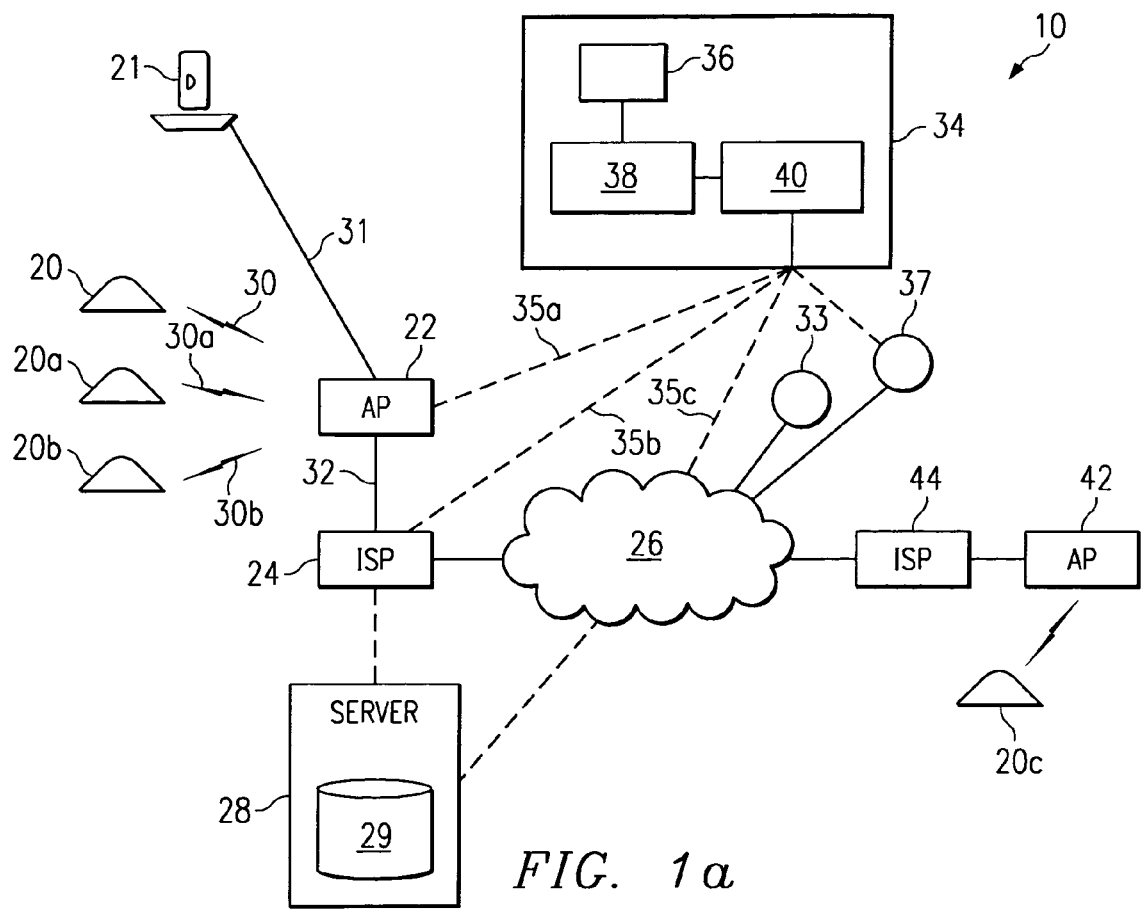
FIG. 1 is a block diagram representation of a communication network having mobile terminals that are capable of communicating with a mobile display appliance (MDA) system also known as terminal system having a remote server with related services.
FIG. 1b is a TCP/IP protocol stack representation of the communication network server of the terminal system and protocol stack of the terminal unit.
FIG. 1c is a TCP/IP protocol stack representation of the communication network server of the terminal system and protocol stack of the terminal unit including detailed marking of the location of the browser specific configuration parameters.

Referring now to FIG. 1, a network 10 includes a terminal 20 coupled to an access point 22. The access point 22 of access provider is coupled to an Internet Service Provider (ISP) 24, which is coupled to an Internet 26. Accordingly, the access point 22 has an Internet address relative to the Internet address of the ISP 24. Additionally, the ISP 24 is coupled to a Mobile Display Appliance (MDA) server 28 also known as remote server that provides the user, through the terminal 20, with specific services and features, which will be discussed in detail herein.

The terminal 20 includes a virtual keyboard, a two-fingered navigational tool, which is the subject of related application U.S. Ser. No. 09/607,359, filed on Jun. 30, 2000, a two-fingered pressure sensitive special click-drag-drop feature, which is the subject of related application U.S. Ser. No. 09/307,638, filed Jun. 30, 2000 and a unique Graphical User-Interfaces (GUI), which is the subject of related application Ser. No. 09/607,409, Jun. 30, 2000.

Server 28 coupled to database 29 provides basic services by providing web-browsing capability to the terminal user. A method to provide the user with wireless access to the internet through a terminal capable of wireless communication includes the steps of powering on the terminal, establishing a communication link with the gateway to obtain an internet address for the server that will be authenticating the terminal and possibly downloading to the terminal vendor and operator specific information and/or parts of program objects, if required, and establishing a communication session between the terminal and the server to allow access to information web browsing service. The communication session between the terminal and server is supported in such a way, that at least information that is required for presenting one display view of web browser session is a possibility. Also in order to have fulfilled vendor and operator requirements of the information presentation and management concerning the user terminal, configuration and other information parameters and possibly some sections of program objects may be conveyed when terminal is active and information transfer in air interface is possible.

If user has had previous browsing session in the past, browser specific parameters having specific configuration content which has been configured by network provider or by vendor is used during web browsing session and is downloaded as required to terminal unit. Other browser specific parameters are those, which have been created during previous browser session(s). The other kind of information are cookies, which are received from accessed Internet sites, and which the service providers are allowed to download to remote server via ISP network. Another kind of information are bookmarks, which were created during previous browsing sessions are now usable from remote server memory means and may be opened for viewing and used as supported by the thin server system. Additionally, in memory means of the remote server exists browsing history information of visited Internet addresses (URLs). Also certificates of access provider, ISP, Mobile appliance service provider or context service provider are such information that may be saved in network side server(s). However it is possible that a certificate of access provider or even ISP is defined and saved in the terminal when terminal is sold to the end user.

Server 28 provides optional services, which are user specific private information such as e-mail, calendar, notes, ability to shop on line and authentication, as well as third party services and information. The server 28 is or may have been connected to peripheral devices such as printer devices and external mass memory storage means, which user needs in order to fulfil his needs at the time.

There may be a plurality of terminals in the system: 20, 20a, 20b, 20c . . . . The use of the term "terminal 20" is to be understood as being one of many terminals in the system. A typical terminal of the invention—terminal 20 may comprise network based applications in network server, (e.g. address book, bookmarks, notice board, e-mail and the like). These applications may be presented to terminal 20 as HTML or other similar mark-up language pages with JavaScript programs included. There are terminal resident programs like virtual keyboard, hardware buttons, connections and presentation/navigation program, such as a browser. Thus, terminal 20 is a terminal client that interfaces with network resident programs such as the above network based applications in such a way, that at least certain amount of information is conveyed from server 28 to the terminal via access point 22.

The authorization may be done before MDA server connection is established as well the authority certificate residing in either terminals 20, 20a, 20b . . . themselves or in access point (AP) 22 or ISP service point 24.

An alternative method to access the internet includes the steps of powering on terminal 20, establishing a communication link with the radio access point 22, which will be authenticating the terminal. The authority certificate may be located either in terminal 20 or in the access point 22 of the access server 28. A connection from terminal 20 via ISP gateway 24 into global network 26 may be established by using a dynamic configuration protocol (DHCP). Then, the access point 22 establishes a communication link with gateway 24 to obtain internet address of the ISP and possibly download, to terminal 20, configuration parameters and/or information of MDA services from an address stored in the access point 22. Terminal 20 is downloaded information and/or parts of program objects as required in terminal 20 for support the MDA services and browsing service. When terminal 20 has received the MDA configuration parameters of the MDA services and any additional pieces of information which may be required. Such downloaded information may include such data, which may be used for login in the access point. Then, a successful login may be made without user providing any input to the terminal. Information may also define login to be made without any login parameter(s) required at all. Alternatively, if the connection establishment is made after previous connection has been disconnected, connection re-establishment occurs when access point 22 may still have the authentication validity information of the previous connection. Then, the authentication may not be required at all. Despite all the above-described, alternative authorization arrangement may be applied by the access point of the access provider, the authorization may occur after the login screen is shown in the terminal. Then, the next step for the user of the terminal is to give the password and the user ID once, which are valid and used from thereon for whatever service is used (i.e. browsing or MDA specific system service). The change from one service to another does not require user to give the authorization information again while the terminal is powered on and having connection to the network since access provider stores the authorization parameters as long as the terminal is served. The browser login may proceed after the access point has completed the authorization of the terminal. The certificate of the access point may be saved in terminal id.

Similarly, the ISP server can activate the authorization. After the connection is established from terminal via access point further to ISP, which activates authorization by requesting from the gateway server the terminal validity; the MDA server then does not have to be used for authorization and login process. The authorization certificate may be stored in ISP 24, access point (AP) 22, or even in terminal 20. The configuration parameters of MDA services used for browser may be downloaded to the terminal from the ISP 24 from the address provided by ISP 24 as a result of this authorization process.

That information may also define login to be made without any login parameter(s) required at all. If the connection establishment is made after previous connection has been disconnected a while ago and new connection establishment is made when ISP may have still the authentication validity information of the previous connection, which had been made by MDA server, then the authentication is not required at all.

In those connection authorization cases when the connection is not made via MDA server, the MDA server may be requested for the authorization certificates resulting in either the access point or the ISP getting the valid certificates to be used in the request message sent to the terminal register in the gateway.

Despite all the above described alternative authorization arrangement activated by the access point of the access provider, the authorization may occur after the login screen is shown in the terminal and user of the terminal gives the password and the user ID once. The authorization is valid and used from there on whatever service is used—browsing or MDA specific system service. The change from one service to another does not require user to give the authorization information again while the terminal is powered on and having connection to the network, since ISP stores the authorization parameters as long as the terminal is served. The access certificate of the internet service point may be stored in the access point 22 or in the terminal 20.

The air interface from the terminal to the access point of the access provider is protected as the air interface security is supported in each possible bearer type to be used. In WLAN, the air-interface is typically protected with standard wire equivalent protection. A shared key ciphering is used in the air-interface protection.

In WLAN, the connectivity from the terminal to the network may have been arranged in such a way, that firewalls are positioned between the terminal and the network to ensure security of the connections. In WLAN, HTTP may be used as well as the secured version of HTTP called HTTPS. The firewall controls from where and to where the connections may be routed and connected. The firewalls require the communication to be started from the terminal and then the server in the network side to respond back to initial request (TSS terminal status server). When terminal request from the server periodically and if no change has occurred in the network side, then it is possible to transfer payload and control information immediately to the terminal; thus, having bi-directional connection between the terminal and the network.

When the terminal is moved, it may happen that the created IP-address connection does not support the terminal any more. What has happen then is, that TCP/IP connections are disconnected resulting in the need to establish the IP address and connection again. Then the authentications need to be done again.

When, for any reason, the logical connection is lost between the terminal and the server of MSP, MDA service provider, then the terminal is in limited service until logical connection is re-established.

The user of the terminal may not have to give any input after powering on the terminal, if the authentication is defined to be done automatically in such a way that network connection points like access point of access provider, the service point of Internet server provider holds the certificates required for authentication, or the terminal sends the authentication when requesting service.

The user payload, that is the actually browsed data content, is conveyed via MDA server making content filtering and content transformation possible. Another alternative is that browsed payload is transported via Internet Service Provider without going through MDA server and thus not producing traffic volume to the MDA server.

Figure 1B:
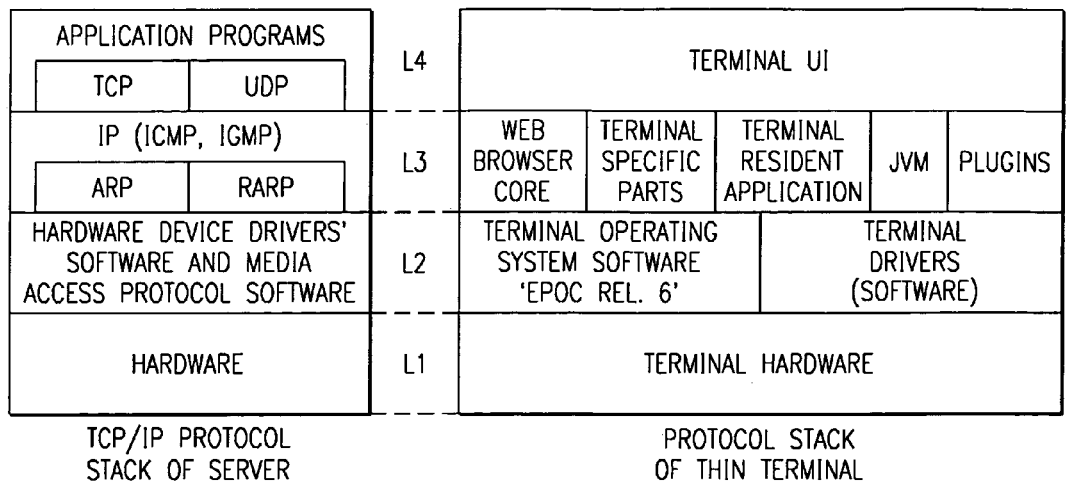
Figure 1C:
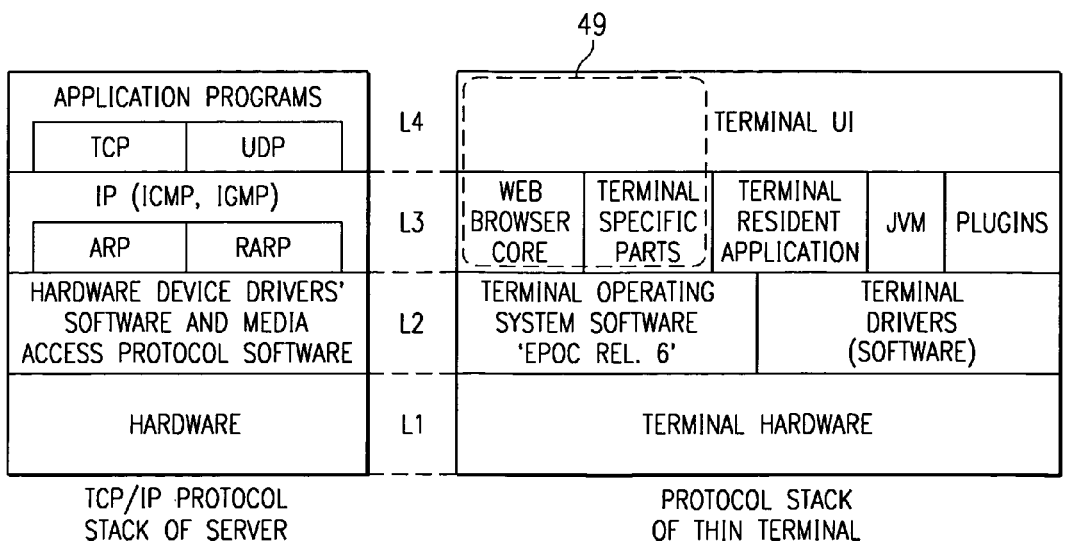

Thinness or vise versa thickness of communication unit informs at what protocol level, also known as protocol layer, the communication connection is established and held between two or more communicating parties. FIG. 1b is an illustration showing transmission control protocol/Internet Protocol (TCP/IP) protocol stack of server unit on the left side and the protocol stack of thin terminal 20, 20a, 20b, 20c, . . . , of the system on the right side. In every protocol stack presentation, layer number (k) is in coupled to and provides services to the layer above it (k+1). In the bottom of both sides and stacks of the FIG. 1b is layer one (L1) called the hardware layer, which provides services that the hardware can offer in the device to layer 2. Layer two (L2) includes all hardware control protocols, and ranges from media access to logical link allocation. For instance, any packet transfer system like X.25 or GPRS of GSM phase 2+ (defined by ETSI) or any other similar packet type protocol may be included in this layer as long as Internet Protocol can use it to transfer datagrams. If one unit communicates to another on this layer, the tunnel between the units is treated like a physical interface of the existing communication connection type despite of its software implementation. The third layer (L3) from the bottom of FIG. 1b on the left side stack is located Internet Protocol (IP). It includes error and control message protocol, ICMP, and the optional multicast group management protocol, IGMP. In FIG. 1b at left stack, the IP spans over the whole layer L3. Below IP, there is listed ARP and RARP, but not all technologies use them. An example is Ethernet, which is local area network (LAN) transfer protocol specified in IEEE 802.3 standard, which defines in detail the used network topology, medium access control (MAC) method and application domain in wired LAN. In wireless LAN (WLAN), the used Ethernet is known in 802.11 standard. Ethernet uses ARP (Address Resolution Protocol). ARP dynamically binds a high-level IP Address to a lower-level physical hardware address. All protocol layers below the IP layer deliver incoming information upwards to the IP layer, and all higher-level protocols must use IP to send outgoing datagrams. IP is shown with a direct dependency on the hardware driver layer because the layer needs to use hardware link or access protocols for transmitting datagrams after it uses ARP to bind addresses. The TCP and UDP comprise the transport layer.

On right hand side protocol stack of FIG. 1b is shown the same kind of layering structure as on the left hand side starting from the bottom where hardware of the terminal is located. Above the hardware layer resides layer numbered as L2. This layer includes driver software of the terminal hardware and terminal operating system called EPOC release 6 just as an example of a possibly used Operating system software of the terminal providing media access protocol software between hardware layer and above residing Internet Protocol layer (L3). Also part of the terminal operating system layer is the set of the terminal specific device drivers that are needed in order to provide necessary interfaces to the terminal specific applications.

On layer three (L3), the Internet Protocol service to upper layer, where terminal user interface application software is located; the application software has to use L3 to transmit datagrams according to application state and parameters. Internet protocol suite in terminal comprises Web browser core software section that comprises main functionality of the browser, thin terminal specific software section, terminal resident application software section, Java Virtual Machine, JVM and plug-ins. The terminal browser shall be able to provide the user interface controls that are specifically required by user interface, UI. In order to have terminal browser available on the terminal platform above the operating systems layer the plug-ins makes that possible.

Those are the parts of the browser, which are isolated in a sense that the basic functionality of the browser can be provided through this layer. The Java Virtual Machine (JVM) comprises Java adaptation to the terminal services. In computer usage, virtual machine is a term used by Sun Microsystems, developers of the Java programming language and runtime environment, to describe software that acts as an interface between compiled Java binary code and the microprocessor (or "hardware platform") that actually performs the program's instructions. Once a Java virtual machine has been provided for a platform, any Java program (which, after compilation, is called bytecode) can run on that platform. Java was designed to allow application programs to be built that could be run on any platform without having to be rewritten or recompiled by the programmer for each separate platform. Java's virtual machine makes this possible.

The Java virtual machine specification defines an instruction set, a set of registers, a stack, a "garbage-collected heap," and a method area. The real implementation of this abstract or logically defined processor can be in other code that is recognized by the real processor or be built into the microchip processor itself. The output of "compiling" a Java source program (a set of Java language statements) is called bytecode. A Java virtual machine can either interpret the bytecode one instruction at a time (mapping it to a real microprocessor instruction) or the bytecode can be compiled further for the real microprocessor using what is called a just-in-time (JIT) compiler.

The terminal utilities are set of modules that are implemented above the terminal operating system or JVM and provide household routines for the terminal and its services. Some terminal services will be accessed via these utilities, meaning that User Interface layer is then not applied. That gives us thickness limit, that is used from available protocol stack resulting this terminal thickness to involve layers 1, 2 and 3 as drawn in FIG. 1b and explained above.

In FIG. 1 was noticed, that the communication session between the terminal and server is supported in such a way, that at least information required for presenting one display view of web browser session is a possibility. That kind of functionality means from FIG. 1b presentation point of view support from terminal plug-ins block of L3 and JVM block of the same layer. Also, in order to have fulfilled vendor and operator requirements of the information presentation and management in user terminal, configuration and other information parameters and possibly some sections of program objects may be conveyed and realized by L3 blocks; plug-ins. and/or JVM by User Interface layer L4 of the terminal. All the previously mentioned section of FIG. 1b right hand side protocol stack support the smallest information to contain one display view information conveyed from remote server 28 to the terminal 20, 20a, 20b, . . . . When information is sent from the terminal user interface as a result of select command given from keypad or touch sensitive display, the selection information is sent in backward direction from the terminal to remote server and affecting a typically similar layer at server side as was used on terminal side controlling the received message handling and used to produce intended response event on terminal side.

When an http request is present in the client, the request is forwarded to the server 28 and interpreted. The server 28 has application specific unit and program, as will be discussed herein, which perform the requested task in the server 28. The requested data is collected in response to the request from the terminal 20 and is formatted from XML to XSL so that the presentation in client can be seen as HTML format.

Terminals 20, 20a, and 20b may be coupled to the access point 22 via wireless connections 30, 30a, and 30b, respectively, and, hence, the user has portable or mobile access to the Internet 26 and the services provided by the server 28. Additionally, a personal computer (PC), work station or other such terminal 21 is coupled to the access point 22 via a communication line such as landline, telephone line, or the like 31. The terminal 21 can be used to access the server 28 using special authentication by any user authorized to access the information and services provided by the server 28. However, the authentication for the user using the terminal 21, which is discussed herein, is slightly different from the authentication procedure for the terminals 20, 20a, 20b, and 20c. More specifically, the terminal 20 is coupled to the access point 22 using a Wireless Local-Area-Network Gateway (WLAN GW) that is installed at a specific location, such as the user's premises or location. In the preferred embodiment, the WLAN GW interface uses Ethernet 802.11 transfer protocol as described earlier. However, other wireless interface protocols, such as GPRS of Global System for Mobile Communications (GSM+), Universal Mobile Telecommunication Systems (UMTS), or other LAN and the like, may be used without limiting the spirit and scope of the present invention as set forth in the claim. If terminal 20 is powered on and within range of the access point 22, then Ethernet protocol is used as a transfer protocol in order to establish and maintain a communication link.

Although the preferred embodiment shows the terminal 20 coupled to the server 28 through the ISP 24, the scope of the present invention, as set forth in the claims, is not limited thereby. For example, the terminal 20 may be coupled directly to the server 28 through the access point 22. Regardless of how the terminal 20 is coupled to the server 28, once the terminal 20 is authenticated, as will be discussed herein, it can function as an Internet browser to access the Internet 26 with the additional ability to retrieve services and information from the server 28. Furthermore, in the embodiment set forth herein, the ISP 24 is separate from and not acting as the server 28 and vice versa, even though this is possible to combine them into one unit.

It will be apparent to those skilled in the art that even though the preferred embodiment shows that the access point 22 coupled to the ISP 24 through a landline 32, the scope of the present invention as set forth in the claims is not limited thereby. For example, the access point 22 can be wirelessly coupled to the ISP 24. Thus, in the preferred embodiment, the terminal 20 accesses the ISP 24 through the access point 22 and, thus, the user can access, navigate through, and retrieve information from the Internet 26 using the terminal 20.

In order for a terminal, such as terminal 20, to have access to the services of the server 28, the server 28 must authenticate and authorize the terminal's access. Although only the authentication and authorization procedure relating to the terminal 20 are discussed in detail, the teachings set forth herein are also applicable to other terminals. Upon proper authentication of the terminal 20 the user can access the services of the server 28 at the authorized level of authentication.

Generally stated, if the terminal 20 is powered on and authenticated by the server 28. Then information of web browser configuration and parameters as initialized in the beginning by the ISP or the vendor and if used earlier by the user, also parameters typically affected while browsing—cookies, bookmarks and browsing history and the information that are stored locally in the remote server 28—are downloaded to the terminal 20. Those configuration and information parameters, which are downloaded from server to terminal resulting in full and enhanced browsing to user of the terminal may be called as splitted system information. The server 28 downloads information to server's protocol layer 3; the layer comprises web browser core, thin terminal specific part (of web browser) and layer 4; thin terminal user interface (UI). The overall specific protocol stack section being marked as 49 in FIG. 1c. Optional service of thin terminal system concerns user profile and configuration setting that can be downloaded is language preferences for a communication session. The language that is preferred is supported in any user interface application function including the browser and any other end user application, which present notices, acknowledgements and any other responses from the local terminal functionality or received from server to terminal user. Other information or services that may be either splitted between the system equipments, terminal and server or receding in terminal side as a whole include configuration data, driver or application related software or portions thereof, configurable parameters, partial sections of system software, or configurable parameters depending on the level of authentication that has occurred with respect to the user. Additionally, the terminal may have access through proper authentication and service purchases to third party publications available from a vendor 33, such as news related information found in magazine publications or the daily newspaper. It will be apparent to those skilled in the art that the information may be purchased by the user and then transmitted by the vendor 33 upon request of the user at the server 28 and then to terminal 20; alternatively, the information could be purchased by an operator/owner of the services provided by the terminal 28 and then resold to each individual thin terminal system user.

There are two levels of authentication that provide access to the services and information of the server 28: a full web browsing session mode and the individual level of the user. The full web browsing is a level of authentication that occurs based on the identity of the terminal 20 in order to initiate a web browsing view in the terminal. Each terminal, which has system server support has a unique identity that allows that terminal access to basic web browsing session or at the individual user level. When another kind of terminal than the previous type is used, the terminal can access Internet and get web browsing session on, (e.g. by using dynamic host configuration protocol DHCP). The DHCP protocol may be used by a host entity to obtain all necessary configuration information including IP address, address of a gateway, address of a name server and a network mask. The remote also known as system server 28 includes storage capacity for storing data related to the individual user as additional option of the system.

In the preferred embodiment when terminal of the system is used and the terminal is in the full or enhanced browsing mode, the login authentication is based on the identity of the hardware of the terminal 20 and the authentication occurs automatically to initiate the web browsing session once the terminal 20 is powered on. Even though the authentication at the basic browsing level occurs automatically, the scope of the invention as set forth in the claims is not limited thereby. Once the terminal 20 is authorized to access the services requiring authorization, then each user of the terminal 20 is able to access information and services that are available only to him/her and initiate an individual communication session to access individual information and services available only to that user. That specific user can have authorized session by giving a password. Thus, the user can initiate an individual session regardless of which terminal is being used. When the user activates an individual session then configuration parameters, which are specific to the user and his previous web browsing sessions as required in the terminal in the beginning of the session, are downloaded to the terminal 20. The network 10 could be set up to allow a user access from any terminal regardless of the association between the user and the terminal 20 as long as the user can be authenticated by the server 28. This is similar to the way a user would gain access to the server 28 from the terminal 21.

First presented is system terminal and server arrangement and secondly other than system terminal without specific system server support. Continuing with FIG. 1, in addition to the ISP 24, the access point 22 is also coupled to a global unit or product vendor 34. As indicated, the access point 22 may be coupled directly to the global unit/product vendor 34 through a link 35*a*. Alternatively, the access point 22 may be coupled indirectly to global unit/product vendor 34 through a landline 32, the ISP 24, and a link 35*b*.

This configuration of direct link to a global unit/product vendor site is part of the initial configuration information, which was downloaded to terminal earlier from the remote server where it was stored as part of configuration information. That information may be updated by ISP from time to time. The direct link 35*a* to global unit/product vendor 34 may be updated automatically down to remote server when it is changed.

Global unit/product vendor 34 includes global address server 36, global upgrade server 38, and firewall unit 40. It will be apparent to those skilled in the art that firewall unit 40 functions to provide secured access to global address server 36 and global upgrade server 38.

The terminal system (MDA system) service provider, MSP does manage the MDA system operating a management server 37, which can be a separate organization from Internet service provider (ISP), but may also be very same company. However, in this logical model, those two are presented as separate sites.

The vendor of system terminal, also known as a vendor of Mobile Display Appliance (MDA) or global unit/product vendor 34, is connected either directly via internet to each remote server 28 or connected more a centralized way first to server of the terminal vendor and from there further on to each remote (home) server 28.

In the preferred embodiment, the Internet address of unit 34 with global address server 36 is permanently contained in the memory of terminal 20. Even though reference is made hereinafter only to the Internet address of global address server 36 without specific reference to the internet address of global unit/product vendor 34, it will be apparent to those skilled in the art that the Internet addresses for the two may be the same or could be slightly different depending on configuration parameters. Global address server 36 is a place from which all the terminals, such as terminals 20, 20*a*, 20*b*, . . . , may fetch the internet address of their respective remote server. The advantage of having terminal 20 store the internet address of global address server 36 is that if terminal 20 was relocated near another access point, then terminal 20 may still obtain the internet address location of server 28 simply by knowing the internet address of global address server 36. However, the scope of the invention as set forth in the claims is not limited thereby. For example, the Internet address of the server 28 could be stored on terminal 20 and the memory of the terminal 20 could be updated as needed.

An advantage to storing the internet address of global address server 36 on terminal 20 is that the association between terminal and server as well as changes in the Internet address of servers can be easily and efficiently updated without having to update the memory of each terminal. The global update server 38 updates the global address server 36 each time there is a change in the association between terminal and server, when there are new terminals to associate with an server, or if the Internet address of a particular server is changed. This remote server 28 change of a particular user terminal 20 happens when user changes their Internet Service Provider to a new one and has a new customer relationship with the chosen network operator. The received remote server 28 address includes the ISP operator address as part of the address of remote server 28 of the user terminal. The server of the terminal service provider of the terminal system 37 among others updates, when required, configuration parameters of browser.

With the internet address of global address server 36 stored in the memory of terminal 20, terminal 20 is able to request and retrieve the internet address of server 28 from global address server 36. Global address server 36 stores information about the location of remote (home) server 28 and all other servers in the network and the corresponding relation between each terminal and its server. Thus, terminal 20 is always able to obtain the address of remote home server 28, which is the server designed to serve terminal 20 and optional service support is applied, enabling individual user profile usage instead of supporting only basic web browsing mode of the thin terminal system. Then the terminal 20*c* coupled through an access point 42 to an ISP 44 can retrieve the internet address of server 28 from global address server 36, provided that server 28 is the server designated to serve the terminal 20*c* and that terminal 20*c* is authenticated by server 28 as an authorized user of the user specific individual services and system application configurations.

If for any reasons the old terminal is changed to a new one in a shop of service provider or (e.g. in a service point), the operator personnel will insert the first used terminal identification into the non-volatile memory of the new terminal device. The first terminal identification information may represent a customer identification number as well as terminal hardware identification. Other logical mappings of first terminal identification information to customer relation identification or to the product of the vendor/ISP is deemed to be within the spirit and scope of the invention. The currently used terminal may include then first used terminal identification information as well as the terminal identification information of the produced terminal. The new terminal, which holds the product and/or terminal identification information may also be used as the serving terminal identification information. Another name for the serving terminal identification would be a logical identification, but the context of the current terminal identification is terminal specific identification information, which is inserted in the terminal by the product vendor. When user has a new terminal in use, the terminal 20 is able to request with both terminal identification information; the first and the new and retrieve the internet address of the server 28 from the global address sever 36. However, the server address request can be made with only one of the terminal identifications—the first or the new. The global address server 36 has information about the location of the remote (home) server 28, which can be found either by requesting it with a request message including either the first or the new terminal identification information. Which of the terminal identification information is used while requesting address of the remote server may be controlled and configured by product vendor resulting in certain management and download functions to be initiated from the global unit 34 of product vendor.

If another (second) type of system terminal is used, the terminal can access Internet and get full web browsing session on, (e.g. by using dynamic host configuration protocol DHCP). After the terminal is powered on and a connection to access point of the network is established, the configuration information including IP address, address of a gateway, address of a name server and a network mask are received in the terminal. After having Internet access established, an attempt is tried to use the address of global update server 38 in order to get connection to global update server 38 of global unit 34. If the connection and address is available, it is possible that remote server of system 28 may be accessed even with a non-system terminal. If global unit cannot provide address of remote server 28 to terminal then a full browsing session is used.

Figure 2:
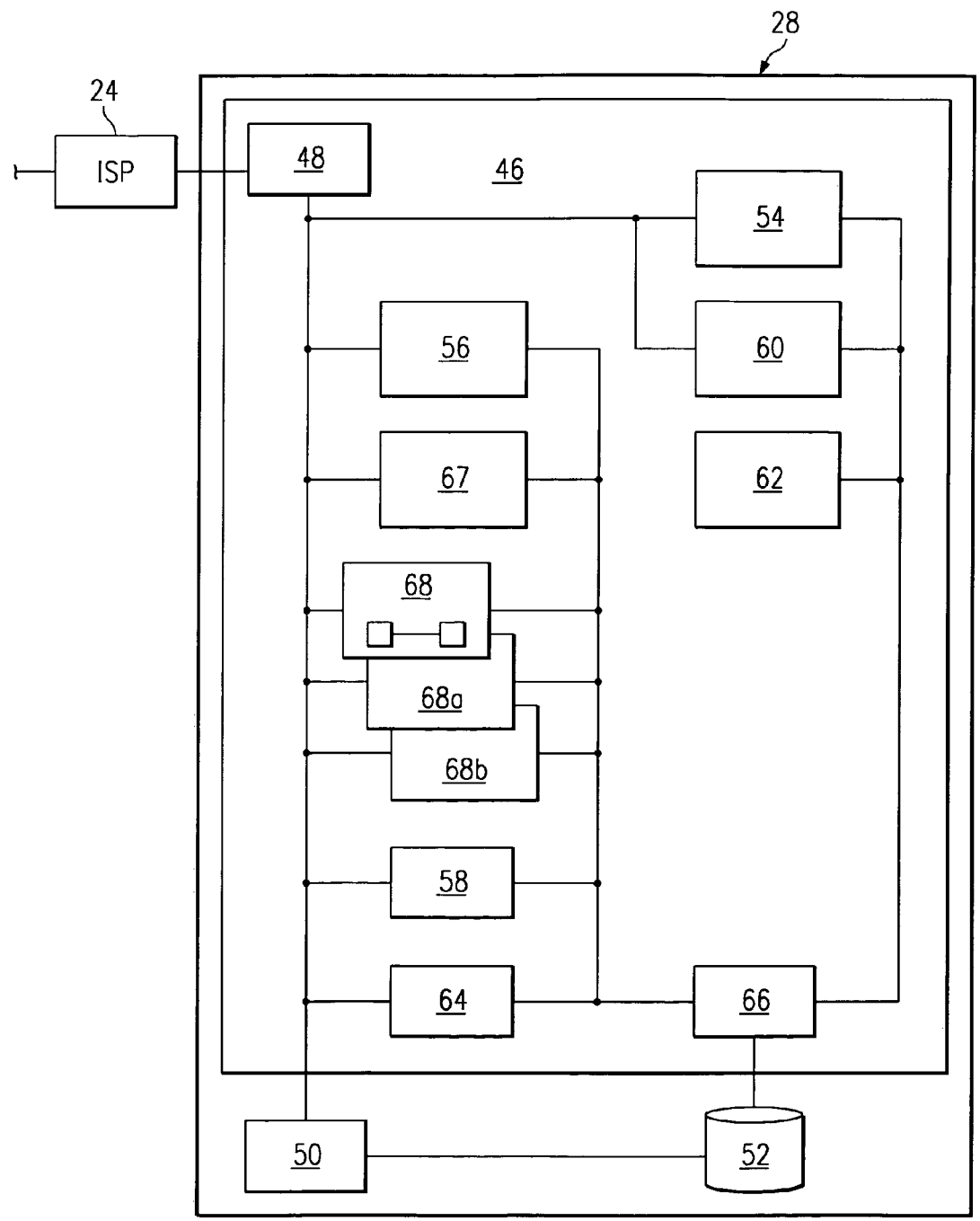
FIG. 2 is a more detailed block diagram presentation of the server of the system of the network of FIG. 1.

Referring now to FIG. 2, server 28 comprises support server 46, external connection server 48, network application server 50, and directory server 52. It will be apparent to those skilled in the art that the referenced connections do not depict the physical connections between the logical elements; the emphasis is merely on the logical connections. The support server 46 provides services oriented towards enabling and supporting the services provided to terminal 20. Support server 46 comprises upgrade service unit 54, login services unit 56, profile services unit 58, advertisement services unit 60, administrative services unit 62, defined services unit 64, and directory client unit 66 of which physical memory medium may be a database 52 or other kind of structured information storage. Support server 46 also comprises web browsing client object specific units 68, 68*a*, 68*b*—as many as required to support all the individual web browsing sessions and in enhanced system mode the user profiles. The user profiles that are to be served may for instance belong to the people living in the same premises and possessing separate and several terminals.

Upgrade services unit 54 is a specific means for controlled software upgrade from manager server 37 or 38 of FIG. 1 to the support server 46. Upgrade serve unit 54 is a logically independent functional entity that may be located on a separate server than support server 46. Updates are transmitted from global upgrade server 38 and its configuration tool manager to upgrade service unit 54 and its configuration tool client. The configuration tool client is the functional unit, which acts when any configuration tool manager 38, 37 of management server upgrades any software component, full executable software program or re-configures configuration parameters, application and system parameters.

Login services unit 56 provides the means for authentication of the user and terminal 20 that is being used to access the services based on information provided by client unit 66. Additionally, login services unit 56 is also responsible for log-off activities, such as individual session termination. Login services unit 56 also manages terminal validation register address (URL of the register or another type address as well, since available used addressing scheme is dependent on if the register is located as part of in ISP network or other network and what are the available addressing schemes between the terminal validation register and the remote server).

The profile services unit 58 provides a means for modifying a user's profile information, (e.g. individual information and preferences). Administration services unit 62 provides a means for administration of support server 46 and external connection server 48. More specifically, administration service unit 62 may include the functionality of configuration tool client as well as upgrade server unit 54.

Advertisement services unit 60 provides a means for server 28 to tailor advertisements to the user and terminal 20 according to the users profile information. Defined services unit 64 is a classification of other services containing items like bookmark management services, help services, log services, name management services, and general management services.

Directory client unit 66 is coupled to directory server 52 to provide client verification. The terminal specific object unit parts 68, 68*a*, 68*b*, ... of the web browser control the terminal specific section of the client side, which cannot be shared between multiple and individual browsing sessions. Such items or parameters, which cannot be shared with other active terminals, but are individual for each terminal are cookies, accessed internet site addresses (the URLS) which are saved for future use into bookmarks, history of addressed Internet sites, all service specific parameters, which are transferred between the terminal and accessed network site, and service activated, used or downloaded from the site. The service specific parameters include system parameters that support terminal specific and other user hidden parameters of browser client 68, 68*a*, 68*b* and the other group of parameters being application specific parameters, which can be seen and even controlled by user. The application specific parameters are managed in remote server by network application server 50 and are used during MDA system terminal session. The system parameters of the service specific parameters are used during non-MDA system terminal session and MDA system terminal session. The previous list is not complete and other than non-listed pieces of information can be controlled and temporarily handled in terminal specific dynamically created client object units 68, 68*a* or 68*b*.

Advertisement services unit 62 includes picture information of still pictures or links and identification information among others, if the actual advertisement information physically resides in the directory server 52 or elsewhere in the server memory medium. The advertisement information may also be a video clip together with image(s) and other advertisement information. Such advertisement(s) may include accessible Internet site addresses(s) the URL(s). Presentation management information of the advertisement information that contain controls of how the data is shown in the User Interface of the terminal may reside partly or totally in the advertisement services unit 60 and/or administrative services unit 62. However, other arrangements in the server is possible concerning advertisement information, advertisement product itself, and additional control information of that product.

Figure 3:
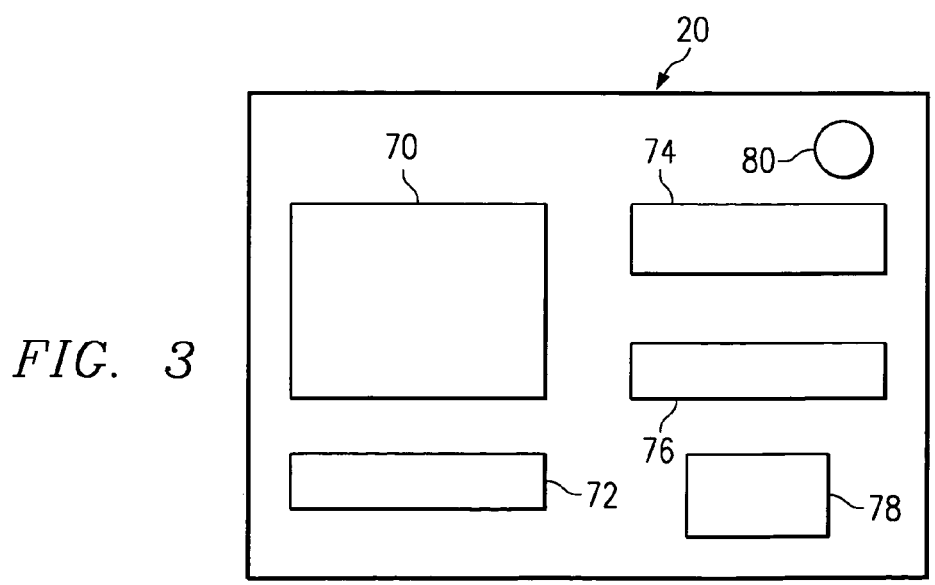
FIG. 3 is a more detailed block diagram of a mobile terminal that operates within the system of FIG. 1.

Referring now to FIG. 3, terminal 20 comprises display 70, user interface (UI) framework 72, browser 74, driver 76, and hardware 78. The driver 76 resides in the memory of the hardware 78 along with other data, such as the Internet address of the global address server 36 and software, such as the browser 74. As terminal 20 is turned on, driver 76 retrieves data relating to the Internet address of global address server 36. In the preferred embodiment, the driver 76 is EPOC6, which is an operating system software that handles hardware related functions in the terminal as well as offer a functioning environment to the application layer programs. Once terminal 20 is powered on, it is coupled to access point 22 and ISP 24. Thus, terminal 20 is able to obtain its own Internet address.

Using the Internet address of global address server 36, terminal 20 is coupled to global address server 36 and sends a request in order to obtain the Internet address of server 28. Once terminal 20 has the Internet address of its server 20, it is then coupled to server 28. In an optional feature of individual user profile being supported in remote server 28, it can authenticate the terminal using the unique identity of the hardware 78 of terminal 20 for logging in, user profile session directly or after user has given additional login via password from the UI of the terminal 20. In full web browsing mode, login and usage of the browsing services are allowed without dedicated authentication by remote server. However, fraudulent usage may be prevented in this thin terminal system. A request may be made of each activated terminal whether it is allowed to be used in the terminal system or browsing services.

A global validation register of terminal identifications may reside in somewhere in the network. The rejection register may be also part of validation register where stolen terminals are listed or these can be separate registers as well. The validation register may also be distributed closer to WLAN network means, in that each of the distributed terminal validation registers include similar list of terminals for which service needs to be rejected. Service operator updates that terminal validation register address to remote server 28. The distributed terminal rejection register may be part of and managed by the network operators network or the distributed terminal rejection register may be managed and located elsewhere in the global network and connected to operator network via Internet. If terminal rejection register is a mandatory feature in the operator network, it can be performed before optional feature authentication of individual user profile and before the access right check out is performed. However, another alternative would be to request terminal validation in parallel to authentication checking or after the authentication is performed by the remote server. According to network management requirements and depending on the service offer grade of remote server, terminal 20 may start full browsing session without remote server support 28, or before terminal 20 is authenticated and logged onto the server 28 to begin a web browsing session with remote server support, or if optional individual profile support is applied and user login is successful according to terminal identification and configuration made to remote server device, then individual user profile, information and enhanced services may be offered for the user. Thus, the user may now access only the basic web browsing service or optional individual user services as well as retrieve information from server 28 or Internet 26. In order for the user to initiate an individual session and retrieve individual information, the user must use terminal 20 and depending on the remote server specific security configurations also provide further authentication to server 28 in order to gain access at the individual level. It will be apparent to those skilled in the art that at either the basic level or the individual level, the user is able to browse Internet 26 to retrieve information.

Browser 74 includes such features as HyperText Transfer Protocol (HTTP), JAVA script, and cascade style sheet capability. As with typical Personal Computers (PCs), browser 74 helps the user navigate through and retrieve information from the Internet once the user is connected to ISP 24 through terminal 20. However, with typical PCs, the user would have to pay large costs when user is away from home or office. The user utilizes terminal 20 to connect to both ISP 24 and remote server 28 using authentication protocol as discussed in detail herein. Terminal 20 is the primary means of access by the user to remote server 28 and the related services and applications. However, the user can also access ISP 24 and remote server 28 using terminal 21 or non-mobile terminal using appropriate shared level authentication initiated manually.

In order to retrieve information or request services from remote server 28 or Internet 26, the user provides input via the terminal unit through UI framework 72. The user can provide input using a virtual keyboard displayed on display 70. Even though the virtual keyboard is used as the user retrieves information from the Internet 26, such as a web page, the user can receive the information at display 70 of terminal 20 in a full screen format. The full screen format is available because UI framework 72 disappears when the user types a Universal Resource Locator (URL) or follows a hyperlink while navigating the Internet 26. The user is returned to UI framework 72, when the user presses button 80. Then the virtual keyboard as well as the header and footer related to the services are presented again. Additionally, once the user presses button 80 the web page, which was a full screen displayed prior to pressing button 80, is reduced to a thumbnail view and positioned in display 70, such as in the bottom left corner of the footer. Consequently, the user has a shortcut to quickly access the web page that was previously visited or to save that web page as a bookmark.

Figure 4A:
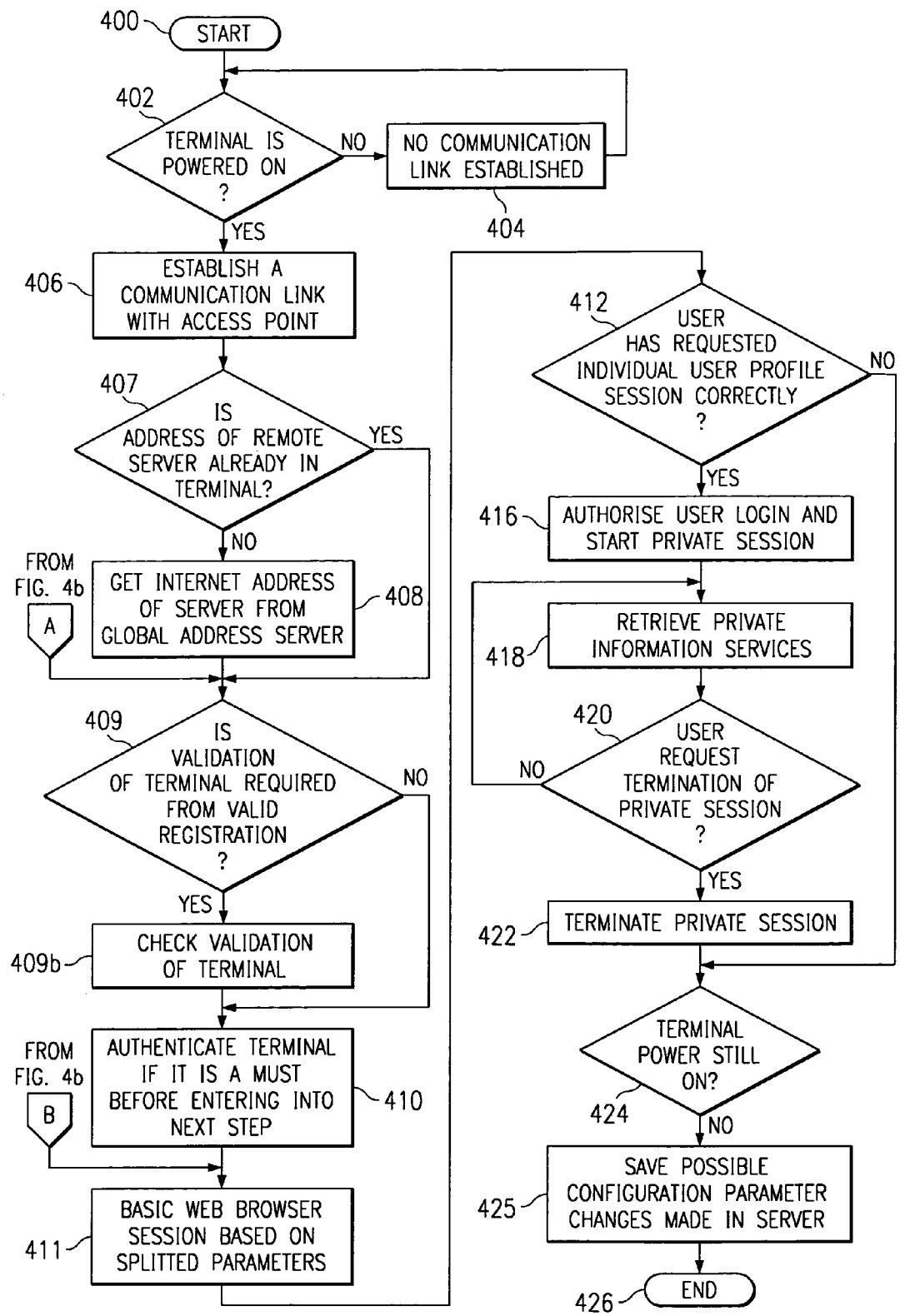
FIG. 4 is a flowchart of the process for establishing an individual session between the mobile terminal and the server of FIG. 1.
FIG. 4b is a flowchart of the process for establishing an individual session between the mobile terminal and Internet without the system server support.
FIG. 4c is a flowchart of second alternative process for establishing an individual session between the mobile terminal and Internet without the system server support.

Referring now to FIG. 4, the process of authenticating a terminal at web browsing level to initiate a user specific browser session, and additionally authenticating the user at the individual level allowing user to initiate an individual session, begins at step 400. At step 402, it is determined whether the terminal is powered on. At step 404, if it is determined that the terminal is not powered on, then a communication link cannot be established through an access point to the server and, hence, the process returns to step 402 until the terminal is powered on. On the other hand, if the terminal is powered on, then the terminal establishes a connection to the access point and, hence, to an ISP and a global address server. At step 408, the terminal obtains the Internet address of its server from the global address server. As result of step 408 request global address, the remote server address is received and a connection from access point serving an Internet connection to remote thin terminal server 28 may be established. A request comprising at least a terminal ID is made of validation register of login services unit 56 in remote server 28 of FIG. 2 and an answer of the services allowed is returned. This validation procedure is described in detail below. The functionality in step 410 contains at least authentication check up in remote server, i.e. the terminal ID is one to be served as well as possible in this remote server and resulting initialization information for login process to be located in detail in this remote server 28. The browser service specific as well as terminal client specific service parameters for browser session and view control are remotely managed by management server to be conveyed to thin terminal in step 411. The conveyed parameters are splitted to be stored in the remote server and, when needed, downloaded to the terminal. The configurations are saved in first specific memory area, which is fully isolated of the other memory area in server in such a way that no harm is caused for the first specific memory area if the second memory area is corrupted or infected by viruses or similar kind of resulting effect has occurred. At step 412, a check is performed to determine if the user has requested an individual user profile session correctly. In other words, has the user already given or has the user been requested to give user password or symbol sequences standing for password while the previous remoter address requests and terminal validation procedures were processed in the server side. The pieces of password symbols may be color buttons, specific pictures of available set of pictures or the like. If user authorization check fails due to incorrect access information, the web browsing activities is the service grade offered for the user until the user inputs individual process access rights, or some application layer process triggers user rights request from user of the terminal, or user has configured certain application to give access right information automatically at certain point of user interface selection and application processing. The terminal system will remain in browsing session 411 until terminal is powered off at step 424 or input of individual access right is input to server correctly 412. Then the session may be changed to an individual private session 416. Then all possible initialization information downloading required in order to have the private services functioning and available for the user from the terminal is done. Typically, profile service unit 58 contains terminal user specific services configuration information such as what kind of language is defined in user's private profile session to be used and possibly basic view configuration which was tailored by the user during an earlier session. User specific applications may appear to user terminal view when basic user profile login view is downloaded to terminal to be displayed as such terminal has received the information transparently from the remote server. Also, some processing of initial user profile login view may be done locally in user terminal as well. Especially when the user has done some alterations to general view during web browser session and it is configured to be supported in private user profile session and the configuration change is not yet saved in remote server.

During personal profile session, user can use full web browsing services as such, individual and private applications, and other services and deliveries from service provider. User stays in private session step 418 until user requests termination of private session himself/herself, or as a result of any application defined to do so, or as a result of a hard key pressing from thin terminal. Then, if termination of private session is given, step 422 is next step. From private session, the terminal and its client specific object section in remote server 28 has returned to full web browser session 411. Then, user may once again request entrance to private session on before switching the power off from the terminal. If the terminal is switched off 424, then terminal session ends in 426. However, before power is really switched off, all user made changes to browser service specific as well as terminal client specific service parameters are conveyed to remote server in which they are saved in first memory area 425.

Other features may be included, such as termination of the individual session if no input is received from the user after a predetermined period of time.

Figure 4B:
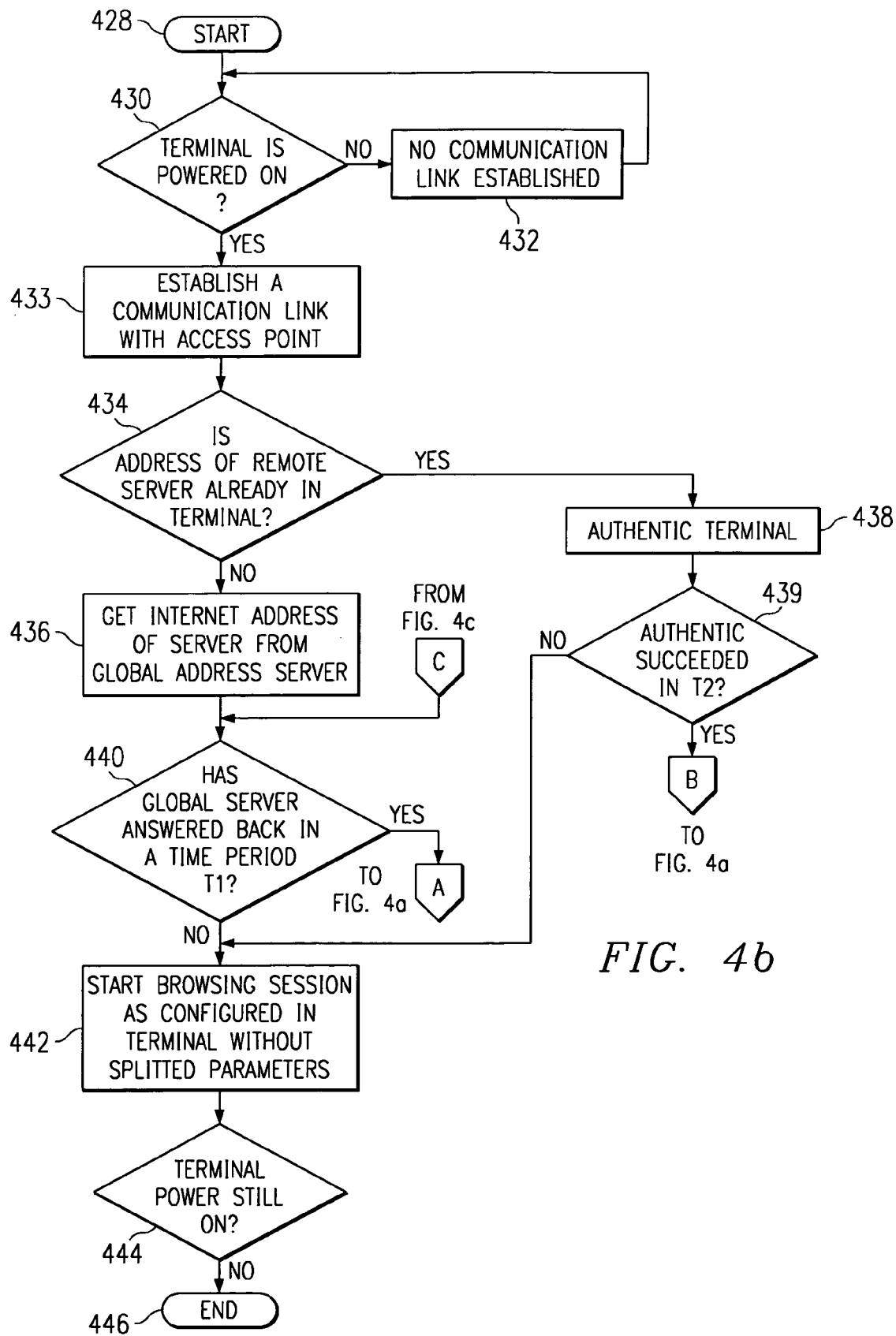

Referring now to FIG. 4b, the process of trying to authenticate a terminal at the web browsing level to initiate a user specific browser session begins at step 428. At step 430, it is determined whether the terminal is powered on. At step 432, if it is determined that the terminal is not powered on, then a communication link cannot be established through an access point to the server and, hence, the process returns to step 430 until the terminal is powered on. On the other hand, if the terminal is powered on, then it establishes a connection to the access point and, hence, to an ISP and a global address server if the address of remote server is not known at the terminal in step 434. At step 436, the terminal obtains the Internet address of its server from the global address server. As result of step 436, request global address, the remote server address can be received and an access point serving an Internet connection to remote server 28 can be established. From remote server 28 in the login services unit 56 of FIG. 2 is located terminal validation register address to where an request is made to validation register; the request message comprising at least terminal ID. If global server does not answer back, the web browsing session is started 442 with configuration information available in the terminal. If the terminal receives an acknowledgement message from global server with remote server address, then the next step is step number 409 as described in FIG. 4. If no answer is received at step 440 from global server during a certain time period T1, then the terminal starts browsing session offering a basic browser interface. In FIG. 4b at step 434, if a remote server address is available for the terminal 20, 20a, 20b, 20c, then the terminal requests authentication to get MDA services as well as Internet connection from the network. If an answer is received of a successful authentication from the server, the next step is step number 411 of FIG. 4. If no authentication answer is received during time period of T2, the terminal starts browsing session offering a browser interface for the user. The terminal system will remain in browsing session 442 until terminal is powered off at step 444. The values of time limits T1 and T2 may be vendor or ISP configured and whenever terminal has connection to MDA server system also the values of T1 and T2 may be re-configured if wanted and the time limit configurations are saved in nonvolatile memory of the terminal.

FIG. 4c is a flowchart alternative for process for establishing a browser session between the mobile terminal and Internet without the system server support.

If another (second) type of system terminal is used, the terminal may access Internet and get full web browsing session on e.g. by using dynamic host configuration protocol HDCP. After the terminal is powered on 452 and connection to access point of the network is established 456, the configuration information including IP address, address of a gateway, address of a name server and a network mask are received 458 in the terminal. After having Internet access established, the address of global update server 38 is tried in order to get connection 460 to global update server 38 of the global unit 34. If that connection and address is available it is possible that remote server of the system 28 can be accessed even with non-system terminal after the remote server address is known by the terminal 462. If global unit cannot provide address of the remote server 28 to the terminal, then full browsing session available at the time is used. The method continues as presented earlier in FIG. 4b. If no answer is received at step 440 from global server in certain time period T1, then the terminal starts browsing session offering a browser interface and certain services. In FIG. 4b, in step 434, if a remote server address is available for the terminal 20, 20a, 20b, 20c, then the terminal request authentication to get MDA services as well as Internet connection from the network. If an answer is received which is a successful authentication from the server, the next step is step number 411 of FIG. 4. If no authentication answer is received in time period of T2, the terminal starts browsing session offering a browser interface for the user. The terminal system will remain in browsing session 442 until terminal is powered off at step 444. The browsing services offered for any or non-MDA system terminal are classified to other service category than the browsing session activated with MDA system terminal. The non-MDA system terminal browsing session may be based on different set of services and the content (or presentation) of any specific service may be different. The values of time limits T1 and T2 may be vendor or ISP configured, if this non-MDA system terminal supports configurable T1 and T2 timers. Then whenever terminal has connection to MDA server system, the values of T1 and T2 may be re-configured, if wanted, and if the time limit configurations are saved in non-volatile memory of the terminal.

Figure 5:
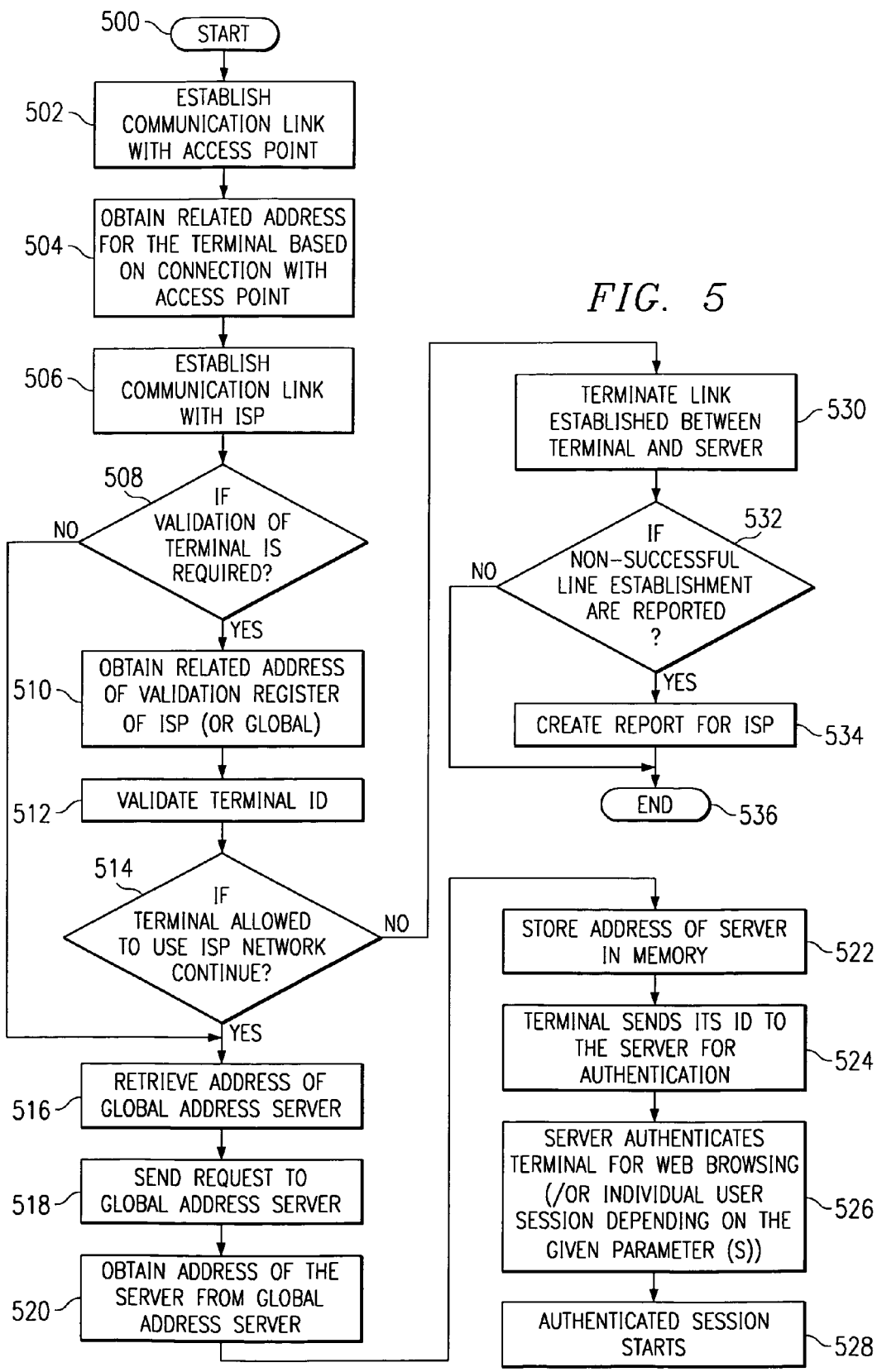
FIG. 5 is a flowchart of the process for establishing a communication link between the mobile terminal and the server.

Referring now to FIG. 5, the process of establishing a communication link to an access point, step 406 of FIG. 4, and obtaining the internet address of an server for that terminal, step 408 of FIG. 4, for initiating a shared session at the shared level, begins at step 500. At step 502, the terminal establishes a communication link with the access point. At step 504, the terminal obtains its Internet address from the access point based on the Internet address of the access point with which the terminal has established the communication link. At step 506, the terminal establishes a communication link with the ISP coupled to the access point. At step 508, the terminal retrieves the Internet address of the global address server from its memory. At step 510, the terminal sends a request to the terminal validation register. The terminal ID is studied by the said control processing unit of the register 512 and answer of the terminal validation result is given back to remote server. The remote register management and control unit 67 (in FIG. 2), that knows the closest or the global terminal validation register address and control unit 67 may also interpret the answer received from said register. If validation result was successful, then user is enabled to use thin terminal unit and system. The global address server is requested next at step 516 following step 518, when actual request message is sent out. After an answer is received back from global access server at step 520, the remote server address is saved in thin terminal unit memory means where it is saved either in RAM or non-volatile memory depending on what kind of memory media is available for saving remote server address in the terminal equipment 20, 20a, 20b and 20c. Steps 508, 510 and 514 can be positioned after steps 516, 518 and step 520 if terminal validation is required by the system. If the terminal validation register is not a global register, but is instead ISP network specific register, then terminal validation register steps are done after steps 516, 518 and 520 preferably before address of the remote server is stored in the memory means of the terminal equipment of step 520. If terminal is not validated to use thin terminal and system services at step 514, link establishment is terminated in step 530. Depending on thin terminal system configuration of general management unit 64 of FIG. 2 and parameter used to control possible non-successful link establishment reports 532 of unsuccessful thin terminal service requests, a report may be generated 534 and sent from remote server to ISP network before final termination of service request is done 536 in server side of thin terminal system.

Figure 6B:
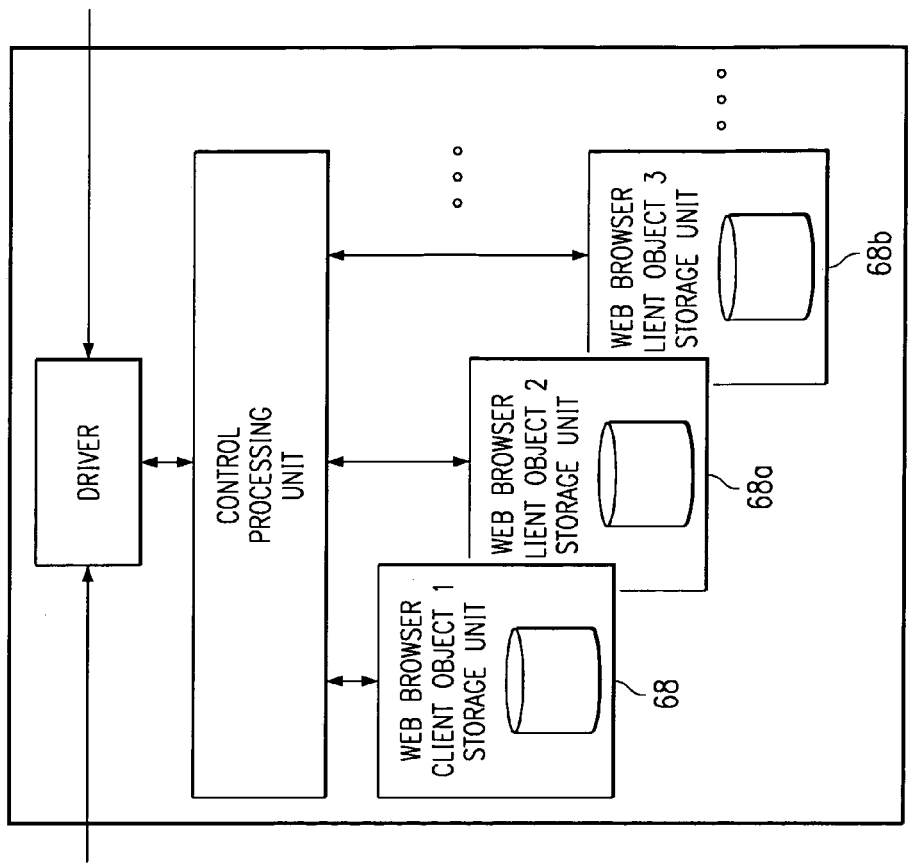
FIG. 6b is a more detailed block diagram of remote server, that is used by one or several terminals.
Figure 6A:
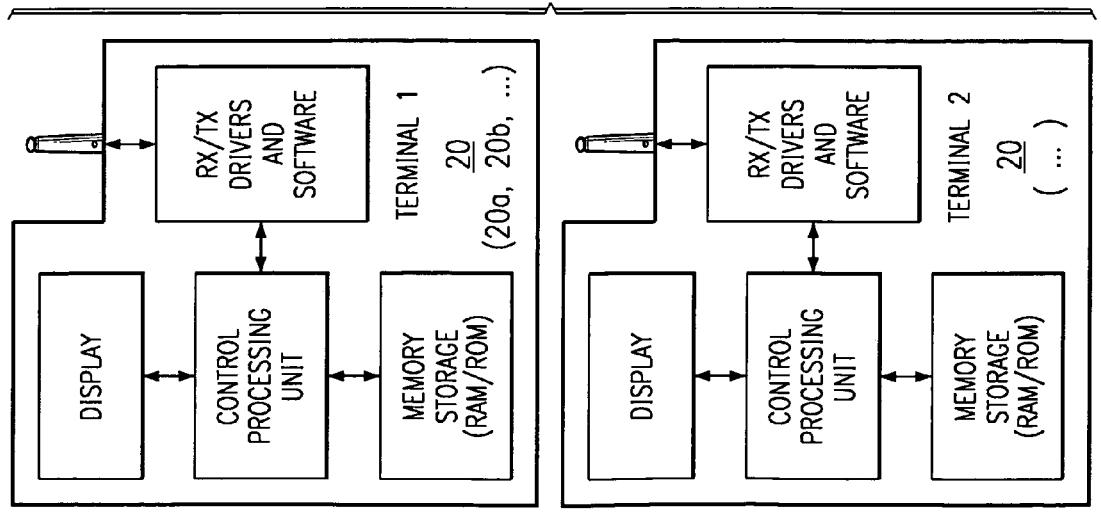
FIG. 6a is a more detailed block diagram of mobile terminals 1 and 2, that operate with one remote server.

In FIGS. 6a and 6b is a more detailed block diagram of mobile terminals 1 and 2, which operate with one remote server. When browser session is activated, either initial browser view or other concatenating views resulting from user selection are conveyed from the server (the same as presented in FIG. 1, unit numbered 28) to the terminal as response to earlier user control input in such a information packages. As a result, an optimum way to transfer, process, and display information in the terminal system is provided. The transferred information package between the terminal and server is at least information enough to be used to update one view on the terminal display, but additional management or configuration information may be included as well. When management and configuration information of a browser is transferred to terminal, the management information received may originate from elsewhere, such as from the ISP network and even from vendor or content server provider. For simplicity, Internet Service Provider and Manager of the thin terminal system (also known as MDA system) is described as one acting manager. Management of MDA system is done by a logical entity called the terminal (MDA system) service provider, MSP, which can be a separate organization or company than ISP. Browser's management and configuration information is located in layer three (L3), layer four (L4) and destination units, that are affected. The said destination units in the terminal structure are web browser core unit, terminal specific part unit or terminal user interface (UI) unit (marked in FIG. 1c as section 49). When an http request is done in the browser client of the terminal, the request is forwarded to the server 28 and if it is not the terminal system specific action, which typically occurs when browser session is logged in or exited from, it is an external Internet service request and session connection is made to requested http destination. If the user given request is further on forwarded from server 28 to Internet, the response to the request may be in XML format and when it is received from Internet network to server, it is conveyed to thin terminal (20, 20a, 20b) where it is formatted from XML to XSL so that the presentation in client can be seen as HTML format. Typically, in browser login action, the server 28 browser client specific parameters 68 are managed individually. That management information of one terminal browser session is stored and used when request is received from an identified terminal 20. Other requests received from terminals (20a or 20b) processing different identification information (IDs) will use browser client specific parameters (68a, 68b) and may result in, for instance, seeking of bookmarks for the thin client terminal if action request originated from terminal or the request may have been, for instance, to display the list of bookmarks in the terminal interface. Bookmarks, cookies or content service providers and other instances like vendor of the product and browsing history are those pieces of information that are session and user specific and kept in memory medium (68, 68a, 68b) of the server 28.

Figure 7A:
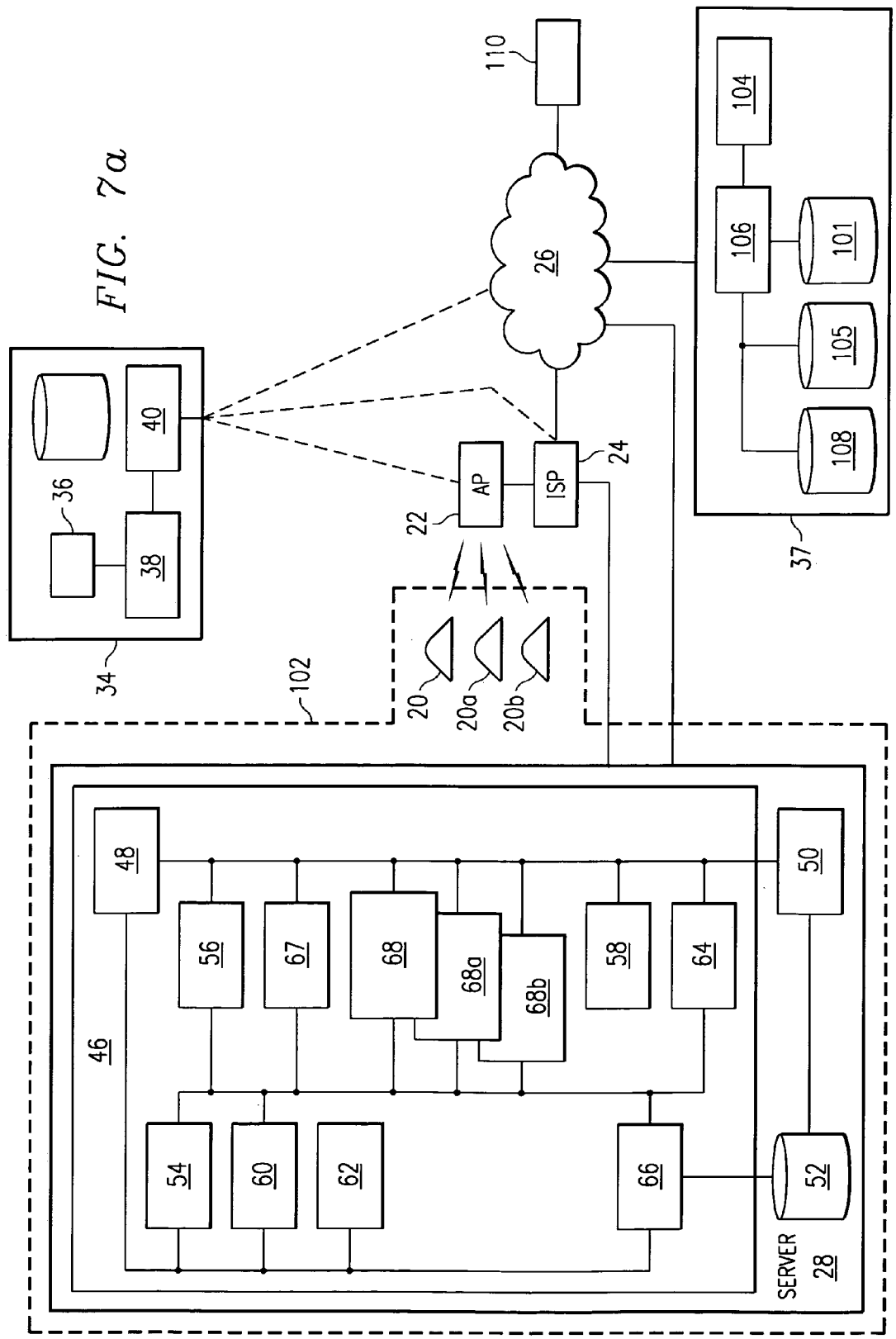
FIG. 7a is a more detailed presentation of management and download methods done by Internet Service Provider is based on a block diagram representation of a communication network.

A more detailed presentation of management and download methods done by ISP/terminal service provider is based on a block diagram representation of a communication network shown in FIG. 7a. The management scheme and units taking part in overall management and download procedures are the server of the system 28, ISP gateway 24, access point 22, server of the terminal service provider of the terminal system (operator of Mobile Digital Appliance system) 37 and the terminal system vendor also known as a Mobile Display Appliance (MDA) vendor 34. The operation and maintenance, O&M of MDA/terminal system is done by unit 37 which is part of the network of terminal (MDA system) service provider, MSP. The MSP may be separate organization from Internet service provider, ISP, but in reality can be very same company as well. For simplicity, only one O&M server of product vendor is drawn, but in reality instead of having only one O&M server, a distributed O&M structure of servers can exist in a large network. In detail described O&M server unit 37 typically includes several databases, of which at least one contains information and reports collected from the network. It is short of statistical database 101 and thin terminal system configuration database 105. The connections to other servers of the MDA network may be built to go through a firewall unit 104. O&M upgrade server 106 also including configuration tools of the system can be a centralized unit of O&M server 37 of the terminal system network meaning that it controls connections of all connections and control of all databases 101 and 105 and have all necessary functionality to support all O&M action required in the network. Also, separate database 108 can, that contains advertisement control information.

The statistical database 101 contains statistics of malfunctionalities occurring in the network and any other event occurrences which may desirable to be traced or recorded. The terminal system configuration database 102 may also contain detailed information of the terminal user subscriptions and terminal user information like name and address. Those non-technical type of information may reside somewhere else in the network of the terminal system provider other than in unit 37. Also charging and billing kind of information may be gathered in billing system that can recide inside the network of thin terminal system provider, but billing may be handled even in network external server if MDA system provider has made contract and externalized that part of the business. The charging reports may be collected to statistical database 101 and from there on conveyed to internal or external billing system.

How a distributed O&M architecture is built is known by a person skilled in the art. Typically O&M keeps database of old and new configuration sets of software packages of each remote server and terminal end user system 102, that is sold out for end users when network service contract agreement is made with terminal user typically. The agreement is made typically when a person buys their terminal and possibly a remote server as well. Depending on what kind of end customer agreement is made, a different specific configuration parameter set is downloaded to the remote server. How the downloaded configuration parameter set affects the terminal is described earlier where powering on the terminal is explained in detail. The terminal system contract may include, for instance, direct link (URL) to Internet address or site to an advertiser or a service provider. The terminal system provider typically then controls that the direct link. The advertiser may want to collect statistical data of what, how often, who has seen the advertisements, and any other statistical information of terminal user behavior. How the configuration information is conveyed to remote server may be arranged in several ways and the following one is only one example others exist and may become apparent by those skilled in the art after reading the specification including the claims.

Figure 7B:
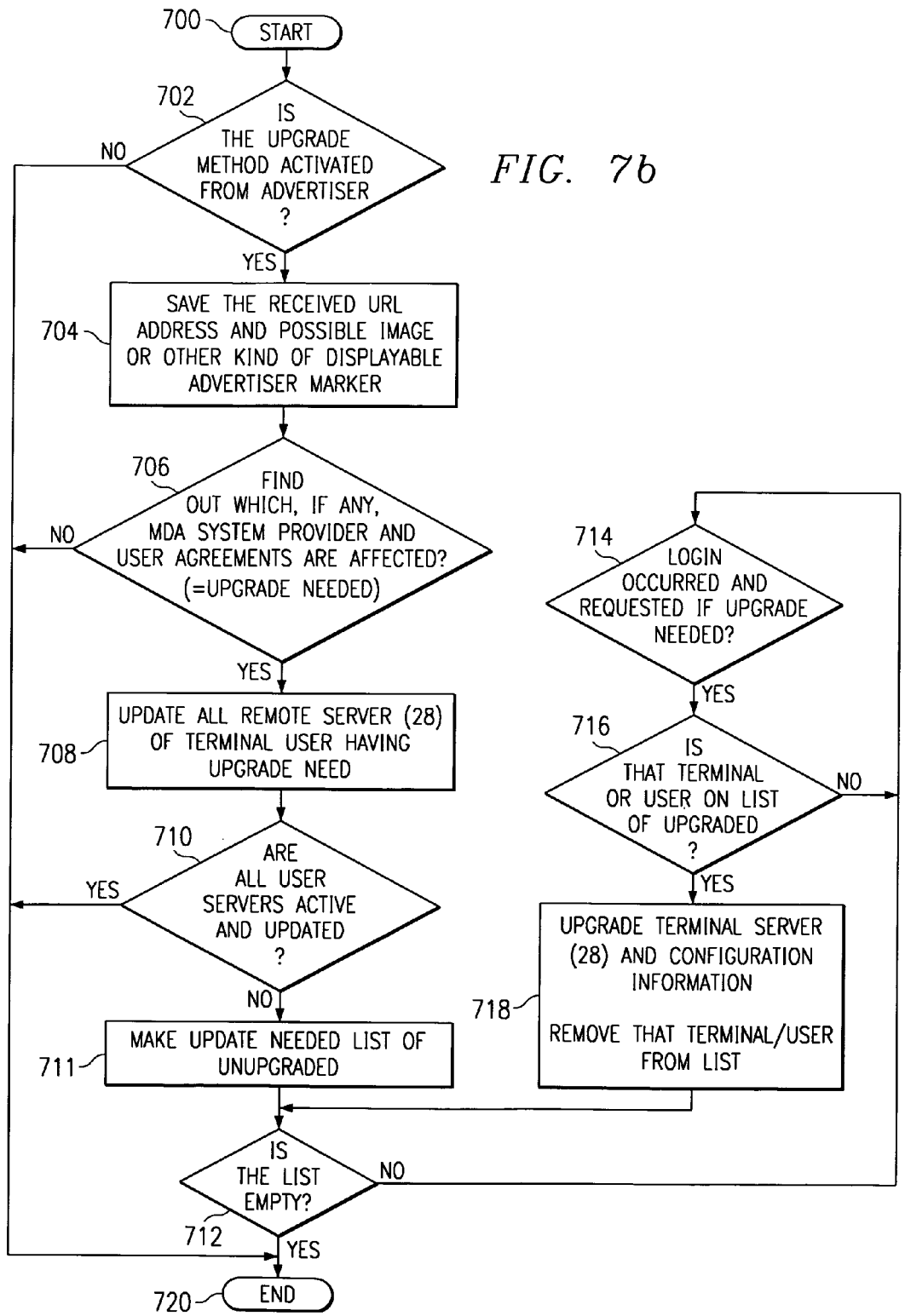
FIG. 7b is a more detailed presentation of management and download methods done by Internet Service Provider is shown in a flowchart.

FIG. 7b is a flowchart of one specific method which comprises several steps, that may be activated from O&M of the terminal system server 37 and its O&M upgrade server 106, or it may be activated from the server of advertiser 110. Then, if upgrade initiator is advertiser 702 and advertisement control information like URL address is received in O&M upgrade server unit 106 of O&M server 37 of the terminal system network, then the next step 704 can be saving the received information to a database like 108. Thereafter, next step 706 is to find out by the control process of O&M upgrade server 106, also known as the configuration tool set, which kind of end user agreements contain this upgraded advertisement control information that is used in browser view and displayed to user all the time or according to specific control arrangement, that needs to reside locally in advertisement services unit 60 of the remote server 28. Then all the users having made that kind of contract resulting in a need to update the browser configuration function will be upgraded 708. A configuration upgrade message including required control information is sent to those remote servers 28 requiring an upgrade and the advertisement server unit 62 locating in those serves. Next steps in control process of O&M upgrade server 106 functionality is to remove all the remote servers or terminal ID or both from the upgrade needed control list and find out if any server that is left non-upgraded after certain time 710 and make list of non-upgraded servers 711. Whenever such a server starts login initialization as a result of the terminal being powered on as described earlier, the remote server makes a check-up request from the O&M upgrade server 106 of O&M server 37. The remote server makes a check-up request, for instance, immediately after terminal is authenticated 410 and certain period of wait time or when O&M server 37 has acknowledged back to remote server 28 the configuration upgrade status and/or changed configuration information.

The initialization information for login process to be located in detail in this remote server 28 in which browser service specific as well as the terminal client specific service parameters for browser session and view control are kept to be conveyed to the terminal in step 411.

In remote server 28, the advertisement services unit 62 may include picture information of still picture advertisement(s) or links and identification information among others, if the actual advertisement information physically resides in the directory server 52 or elsewhere in the server memory medium. The advertisement information may also be a video clip alone or together with image(s) and/or other advertisement information. Such advertisement(s) may include assessable Internet site address(es)—the URL(s). Presentation management information of the advertisement information that contains controls on how the data is shown in the User Interface of thin terminal may reside partly or totally in the advertisement services unit 60 and/or administrative services unit 62. However, other arrangements in the server are possible concerning advertisement information, advertisement product itself, and additional control information of that product.

Other typical O&M functionality among other duties is to keep up to date terminal validation register where all fraudulent users/terminals and stolen terminals are registered. Also unsuccessful service requests from terminals may be reported to and collected in thin terminal system provider database 101, which is located in at least one O&M server.

The terminal system vendor, which is also known as a Mobile Display Appliance (MDA) vendor 37, is connected either directly via internet to each remote home server 28 or connected in a more centralized way first to server of the product vendor 34 and then to each remote home server 28.

The update arrangement and scheme of advertisement information to be updated in the terminal system may be generalized to also include any other terminal system provider configuration scheme, which is needed in order to have specifically configured browser settings. Those certain configured browser settings enable certain browser specific software items such as cookies to function in the terminal. Only difference between the above described FIG. 7a and 7b arrangement and method would be that the processed steps of a method of O&M server 37, which is described in detail in FIG. 7b above, lacks step 702, 704, and 706 instead of which specific control processes of O&M upgrade server 106 that function as a configuration manager comprising set of configuration tools, which may be initiated, for instance, from user interface of O&M server 37 and used by personnel of the terminal service provider company. Necessary configuration changes are made in O&M server 37 resulting, for instance, in browser view change to all or certain group of users.

Figure 8A:
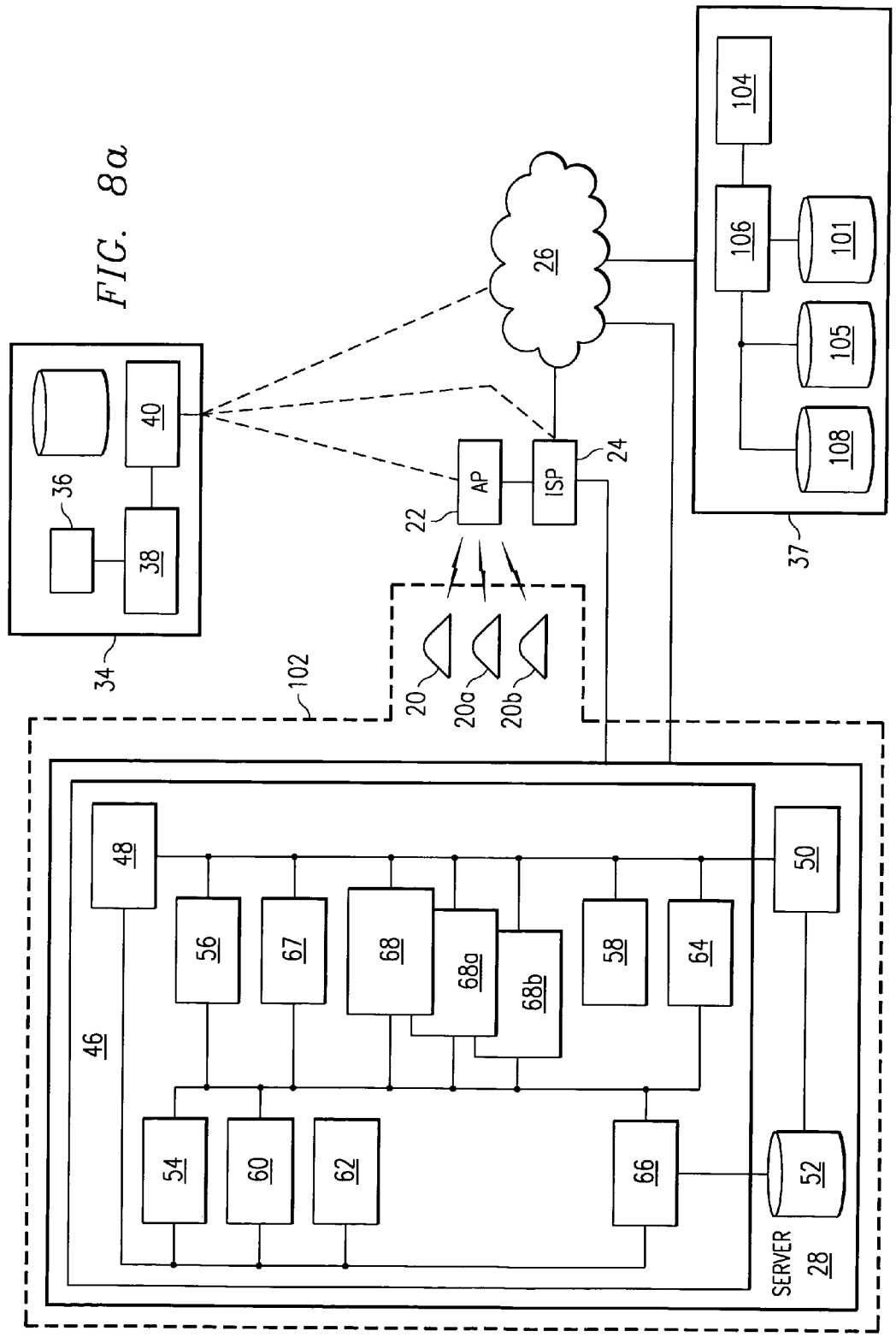
FIG. 8a is a more detailed presentation of management and download methods done by vendor is based on a block diagram representation of a communication network.

When thin terminal (MDA product) provider has some new terminal system functionality to be offered to network operator and their clients, the new user application or other similar functionality may be downloaded from 37; and the terminal system vendor also known as a Mobile Display Appliance (MDA) vendor 34 is now the initial source of the downloaded software elements. The operation and maintenance (O&M) of MDA/terminal system is done by unit 37 which is part of the network of the terminal (MDA system) service provider (MSP). FIG. 8a is a more detailed presentation of management and download methods performed by vendor and is based on a block diagram representation of a communication network. The vendor initiated management scheme and units taking part in overall management and download procedures are the server of the system 28, ISP gateway 24, access point 22, server of the product vendor of the thin terminal system (i.e vendor of Mobile Digital Appliance (MDA) system) 34. Additionally, the operation and maintenance (O&M) of MDA/thin terminal system is performed by unit 37 which is part of the network of the terminal (MDA system) service provider (MSP). In detail, O&M server unit 37 typically includes several databases; database of statistics 101, database of the terminal system configuration 105, and database of advertising 108. A firewall unit 104 and O&M upgrade server 106, which also includes configuration tools of the system, are included in O&M server. How the initially vendor activated software update affects the terminal and its software configuration is described above in section where powering on the terminal is explained in detail. How the software update and configuration information is conveyed to remote server may be arranged in several ways and following is to be used as exemplar only.

FIG. 8*b* is a flowchart of one specific method comprising several steps, which may be initially activated (start 800) from vendor server 34 which further on activates the O&M of the terminal system server 37 and its O&M upgrade server 106. If upgrade initiator is activated at step 802, the receiving entity of product vendor is in O&M upgrade server unit 106, which contains configuration tools of O&M server 37 of the terminal system network. Then the next step 804 may be saving the received information to a database like system configuration database 105, a specific software component or package database 109.

The next step at 806 is to find out by the control process of O&M upgrade server 106 which kind of end user products need to have at least a partial software program or a component upgrade. The software component or product to be updated may also be updated to remote server 28 only. This does not result in any additional updates to terminal equipment 20, 20*a*, 20*b* and 20*c*. Next, all the users identified as requiring a software upgrade may be updated in step 808. This may be in the form of an upgrade message including required upgrade information. Product package or partial product package is sent to those remote servers 28 requiring upgrades and possibly one or several units of the following list: login services unit 56, profile services unit 58, administrative services unit 62, browsing client specific object units 68, 68*a*, 68*b*, upgrade service unit 56, network application server unit, upgrade service unit 54 remote register management and control unit 67, general management unit 64 or any program or object block unit reciting in remote server 28 or terminal 20, 20*a*, 20*b*.

The next step in control process of O&M upgrade server 106 functionality is to remove all the remote servers or terminal ID or both from the upgrade needed control list and find out the servers, if any, which are left non-upgraded after certain time 810 and make a list of non-upgraded servers 811. Whenever such a server starts login initialization as a result of the terminal being powered on as described above, the remote server makes a check-up request from the O&M upgrade server 106 of O&M server 37. The remote server makes a check-up request, for instance, immediately after the terminal is authenticated 410 or after a certain period of time or when O&M server 37 has sent an acknowledgement back to remote server 28 of the software and/or configuration upgrade status and/or changed configuration information.

The initialization information for the login process may be located in detail in remote server 28. The information may include browser service specific as well as thin client specific service parameters for browser session and view control. This information may be conveyed to the terminal in step 411 of FIG. 4 as described above.

It may be possible that not all new software is introduced to be used by MDA product vendor. Then a certification and validation is to be made to the software to be downloaded to the remote server of MDA 28 and the terminal 20, 20*a*, 20*b*.

Figure 9A:
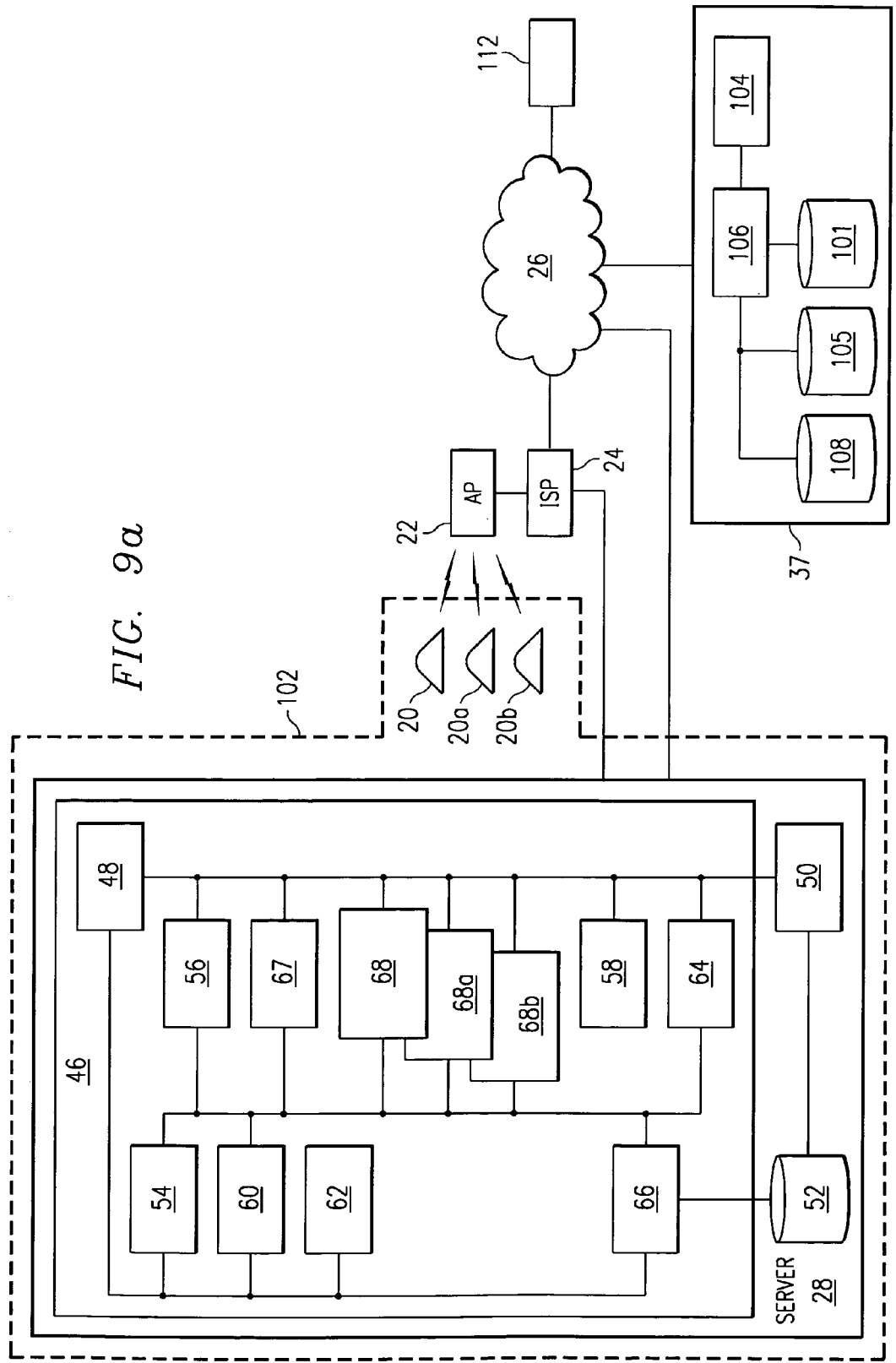
FIG. 9a is a more detailed presentation of management and download methods done by content service provider is based on a block diagram presentation of a communication network.

FIG. 9*a* is an illustration of a more detailed presentation showing the management units and download paths used by the content service provider when the information product is first distributed to the MDA service provider and from there distributed to those customers who have subscribed and/or ordered the information product. The management scheme and units taking part in overall management and download procedures comprises the server of the system 28, ISP gateway 24, access point 22, server of the thin terminal service provider of the terminal system (operator of Mobile Digital Appliance system) 37. The operation and maintenance (O&M) of MDA/terminal system is performed by unit 37, which is part of the network of terminal (MDA system) service provider (MSP). The MSP may be a separate organization from Internet service provider (ISP), but in reality may be very same company as well. In detail, the described O&M server unit 37 typically includes several databases: statistical database 101, thin terminal system configuration database 105, possibly a separate software product/element database and end product database of content providers products 109. The connections to other servers of the MDA network may be built to go through a firewall unit 104. O&M upgrade server 106 may be a centralized unit of O&M server 37 of the thin terminal system network, meaning that it managers all connections and control of all databases 101, 105, and 109 and have all necessary functionality, such as confirmation tools to support all O&M action required in the network.

How a distributed O&M architecture is built is known by a person skilled in the art. The agreement is made between end user, also known as terminal system user, and content provider; but, in this terminal system, it is possible to have one or some additional backup copies of the end service product like a magazine to be conveyed from product seller's Internet server to the terminal system (MDA system) operator. Then, the product is, for instance, transferred to O&M server 37 where it is locally saved to a database like the end product database of content providers products 109. From there it is further distributed to the remote servers 28 of the customers, who have made a subscription with the MDA system operator 37 or directly to end user providers 112. The product is then transferred to remote servers of the end users and finally, when the end user wants to access the product, it is shown or played or both to end user in as small of product pieces as required.

Figure 9B:
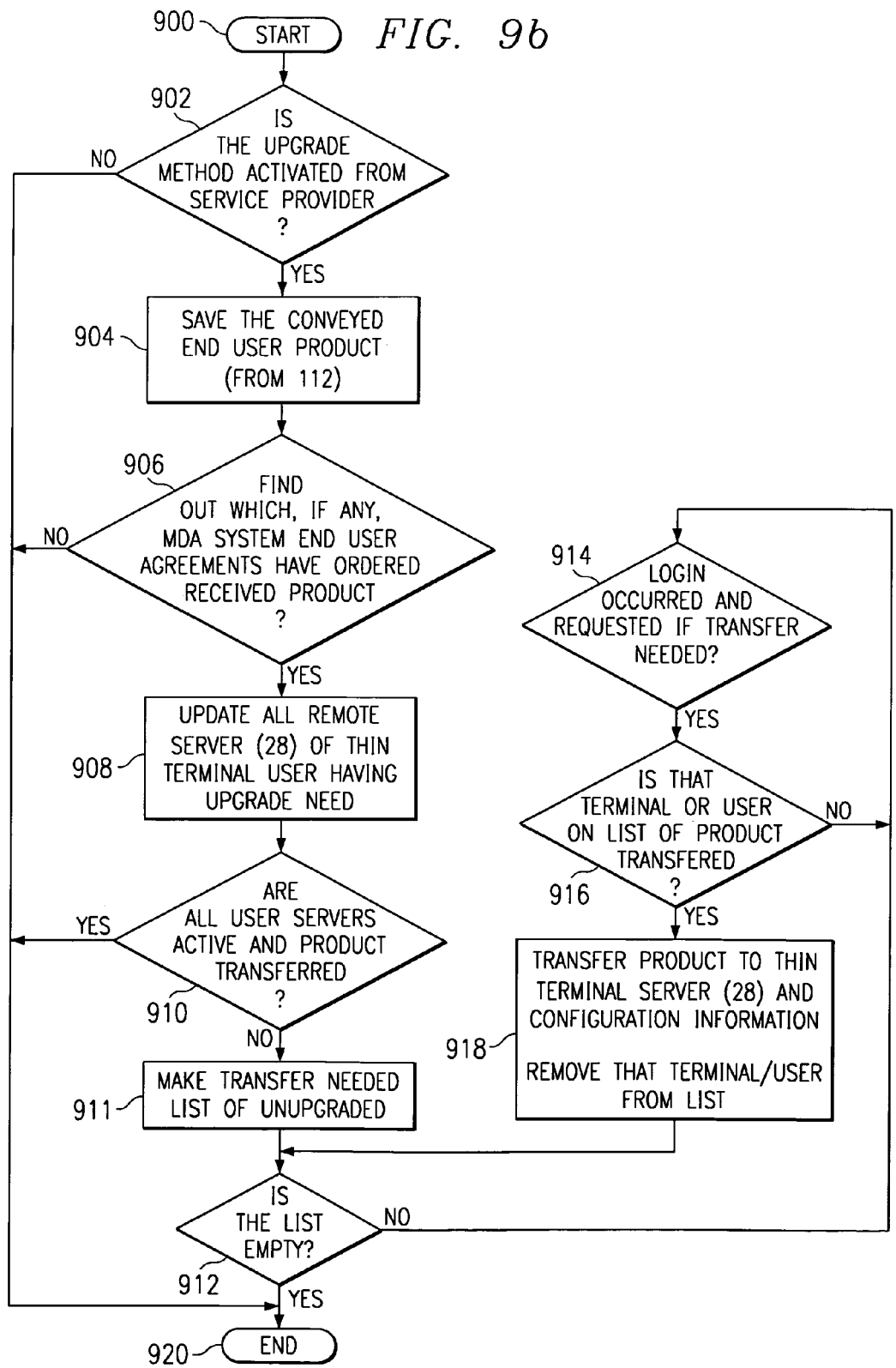
FIG. 9b is a more detailed presentation of management and download methods done by content service provider is shown in flowchart.

FIG. 9*b* is a flowchart of a method embodiment of the invention comprising several steps, which may be activated from O&M of the terminal system server 37 and its O&M upgrade server 106, which includes the configuration tools; or it may be activated from end product provider's server 112 and its configuration tools depending on how and what basic method of the overall end scheme of product delivery is studied in detail. First, the new end user product is released from content product server 902 and one or possibly some back up copies as well are received in O&M upgrade server unit 106 of O&M server 37 of the terminal system network. Then next step 904 may be saving the received information to a database like 109. In step 902, it is an option to perform virus check of the downloaded end user product with any virus search program like currently available Norton Antivirus™ program or other such virus search programs, which may be supported in the used operation system of the server.

Then next step 906 is to find out by the control process of O&M upgrade server 106 which kind of end user agreements are those, which contain the end product delivery subscription and provide for upgrades. Then all the users having made such a contract resulting in a product transfer to their remote server 28 will be upgraded 908. Typically, this involves a delivery message including required product information being sent to those remote servers 28 requiring an upgrade. The next step in control process of O&M upgrade server 106 functionality of its control tool is to remove all the remote servers or terminal ID or both from the delivery needed control list and identify any servers that are left undelivered after certain time 910 and make a list of undelivered servers 911. Whenever such servers start login initialization as a result of terminal being powered on as described above, the remote server makes a check-up request from the O&M upgrade server 106 of O&M server 37. The remote server makes a check-up request, for instance, immediately after terminal is authenticated 410, after a certain period of time has past, or when O&M server 37 has sent an acknowledgement back to remote server 28 of the successful status of product transfer.

When a product transfer to remote server 28 of user as a result of upgrade in step 908 of O&M terminal system server 37, the information stored in remote server 28—browser service the service content product, which is received—are saved in first memory area as opposed to second memory area. The second memory area is where any other more temporary information is stored, resulting in full isolation of the two memory areas in the server in such a way that no harm is caused for the first memory area if the second memory area is corrupted or infected by viruses or of the like. Then, before the conveyed content product is allowed to be transferred further to the user terminal 20, 20a, 20b, 20c, the downloaded end user product is validated and inspected with available virus search program like currently sold Norton Antivirus™ or other such virus search programs, which are supported in the used operation system of the server.

The initialization information for login process may be located in detail in the remote server 28 in which browser service specific as well as thin client specific service parameters for browser session and view control are stored and may be conveyed to thin terminal in step 411 of FIG. 4.

The content product information may include video clips, videos, text, still pictures and/or sound. However, other arrangements in the server may be possible concerning advertisement information, the advertisement product itself, and additional control information of that product.

Although described in the context of particular embodiments, it will be apparent to those skilled in the art that a number of modifications to these teachings may occur. Thus, while the invention has been particularly shown and described with respect to one or more preferred embodiments thereof, it will be understood by those skilled in the art that certain modifications or changes, in form and shape, may be made therein without departing from the scope and spirit of the invention as set forth above and claimed hereafter. The applicant herein defines "plurality" to be one of more.

What is claimed is:

1. A method comprising:
   receiving a configuration upgrade message at a configuration server from a source of an at least partial software upgrade;
   saving upgrade information in a database associated with the configuration server;
   identifying a plurality of users requiring at least partial software upgrade;
   thereafter providing the at least partial software upgrade to respective terminal servers associated with the plurality of users identified to require the at least partial software upgrade for subsequent distribution by the terminal servers to respective terminals of users identified to require the at least partial software upgrade;
   identifying any terminal servers, following the provision of the at least partial software upgrade to which the at least partial software upgrade has not yet been transferred; and
   determining, in response to activation of a terminal associated with a terminal server, if the terminal server has been identified as a terminal server to which the at least partial software upgrade has not yet been transferred and, if so, providing the at least partial software upgrade to the terminal server.

2. The method of claim 1, further comprising updating at least one terminal associated with a respective terminal server with the at least partial software upgrade provided to the terminal server.

3. A method comprising:
   receiving an initial upgrade message in a configuration server from a service provider to provide an end service product;
   receiving and saving an end service product in a database associated with the configuration server;
   identifying a plurality of users having a contract requiring delivery of the end service product;
   thereafter providing product information relating to the end service product to respective terminal servers associated with the plurality of users identified to have contracts requiring delivery of the end service product for subsequent distribution by the terminal servers to respective terminals of users identified to have contracts requiring delivery of the end service product;
   identifying any terminal servers, following the provision of the end service product to which the end service product has not yet been transferred; and
   determining, in response to activation of a terminal associated with a terminal server, if the terminal server has been identified as a terminal server to which the end service product has not yet been transferred and, if so, providing the end service product to the terminal server.

4. The method of claim 3, wherein the end service product is transferred to the terminal server and a virus search is made to the end service product prior to conveying the product to the terminal server.

5. The method of claim 3, further comprising identifying any terminal servers, following the provision of the product information, to which product information has not yet been transferred.

6. The method of claim 5, further comprising determining, in response to activation of a terminal associated with a terminal server, if the terminal server has been identified as a terminal server to which product information has not yet been transferred and, if so, providing product information to the terminal server.

7. A system comprising:
   a configuration server unit for receiving a configuration upgrade message from a source of an at least partial software upgrade, for identifying a plurality of users requiring the at least partial software upgrade and for thereafter providing the at least partial software upgrade to respective terminal servers associated with the plurality of users identified to require the at least partial software upgrade for subsequent distribution by the terminal servers to respective terminals of users identified to require the at least partial software upgrade, the configuration server unit being further configured to identify any terminal servers, following the provision of the at least partial software upgrade, to which the at least partial software upgrade has not yet been transferred and to determine, in response to activation of a terminal associated with a terminal server, if the terminal server has been identified as a terminal server to which the at least partial software upgrade has not yet been transferred and, if so, provide the at least partial software upgrade to the terminal server, wherein said configuration server unit comprises a database for saving upgrade information provided by the source of the at least partial software upgrade and for associating the saved upgrade information with the source of the at least partial software upgrade.

8. A system comprising:

a configuration server unit for receiving an initial upgrade message from a service provider that is capable of providing an end service product, for identifying a plurality of users having a contract requiring delivery of the end service product and for thereafter providing product information relating to the end service product to respective terminal servers associated with the plurality of users identified to have contracts requiring delivery of the end service product for subsequent distribution by the terminal servers to respective terminals of users identified to have contracts requiring delivery of the end service product, the configuration server unit being further configured to identify any terminal servers, following the provision of the end service product, to which the end service product has not yet been transferred and to determine, in response to activation of a terminal associated with a terminal server, if the terminal server has been identified as a terminal server to which the end service product has not yet been transferred and, if so, provide the end service product to the terminal server, wherein said configuration server unit comprises a database for saving the end service product identified by an initial upgrade message from the respective service provider.

9. An apparatus comprising:

an upgrade server unit for identifying a plurality of users requiring an at least partial software upgrade and for thereafter providing the at least partial software upgrade to respective terminal servers associated with the plurality of users identified to require the at least partial software upgrade for subsequent distribution by the terminal servers to respective terminals of users identified to require the at least partial software upgrade, the upgrade server unit being further configured to identify any terminal servers, following the provision of the at least partial software upgrade, to which the at least partial software upgrade has not yet been transferred and to determine, in response to activation of a terminal associated with a terminal server, if the terminal server has been identified as a terminal server to which the at least partial software upgrade has not yet been transferred and, if so, provide the at least partial software upgrade to the terminal server, wherein a source of the at least partial software upgrade provides upgrade information saved in a database that associates the saved upgrade information with the source of the at least partial software upgrade.

10. An apparatus comprising:

an upgrade server unit for identifying a plurality of users having a contract requiring delivery of an end service product and for thereafter providing product information relating to the end service product to respective terminal servers associated with the plurality of users identified to have contracts requiring delivery of the end service product for subsequent distribution by the terminal servers to respective terminals of users identified to have contracts requiring delivery of the end service product, the upgrade server unit being further configured to identify any terminal servers, following the provision of the end service product, to which the end service product has not yet been transferred and to determine, in response to activation of a terminal associated with a terminal server, if the terminal server has been identified as a terminal server to which the end service product has not yet been transferred and, if so, provide the end service product to the terminal server, wherein a service provider capable of providing the end service product of the at least partial software upgrade provides an initial upgrade message identifying the end service product saved in a database.

11. A computer program product comprising at least one computer-readable medium having computer-readable program instructions stored therein, the computer-readable program instructions comprising:

a first executable portion for receiving a configuration upgrade message from a source of an at least partial software upgrade;

a second executable portion for saving upgrade information in a database;

a third executable portion for identifying a plurality of users requiring at least partial software upgrade;

a fourth executable portion for thereafter providing the at least partial software upgrade to respective terminal servers associated with the plurality of users identified to require the at least partial software upgrade for subsequent distribution by the terminal servers to respective terminals of users identified to require the at least partial software upgrade;

a fifth executable portion for identifying any terminal servers, following the provision of the at least partial software upgrade to which the at least partial software upgrade has not yet been transferred; and a sixth executable portion for determining, in response to activation of a terminal associated with a terminal server, if the terminal server has been identified as a terminal server to which the at least partial software upgrade has not yet been transferred and, if so, providing the at least partial software upgrade to the terminal server.

12. A computer program product comprising at least one computer-readable medium having computer-readable program instructions stored therein, the computer-readable program instructions comprising:

a first executable portion for receiving an initial upgrade message from a service provider to provide an end service product;

a second executable portion for saving an end service product in a database;

a third executable portion for identifying a plurality of users having a contract requiring delivery of the end service product;

a fourth executable portion for thereafter providing product information relating to the end service product to respective terminal servers associated with the plurality of users identified to have contracts requiring delivery of the end service product for subsequent distribution by the terminal servers to respective terminals of users identified to have contracts requiring delivery of the end service product;

a fifth executable portion for identifying any terminal servers, following the provision of the end service product to which the end service product has not yet been transferred; and a sixth executable portion for determining, in response to activation of a terminal associated with a terminal server, if the terminal server has been identified as a terminal server to which the end service product has not yet been transferred and, if so, providing the end service product to the terminal server.

* * * * *